United States Patent
Inoue et al.

(10) Patent No.: US 10,026,959 B2
(45) Date of Patent: Jul. 17, 2018

(54) NEGATIVE ELECTRODE ACTIVE MATERIAL INCLUDING FIRST, SECOND, AND THIRD REGIONS AND POWER STORAGE DEVICE INCLUDING THE NEGATIVE ELECTRODE ACTIVE MATERIAL

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Kiyofumi Ogino, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 319 days.

(21) Appl. No.: 14/714,479

(22) Filed: May 18, 2015

(65) Prior Publication Data

US 2015/0340691 A1    Nov. 26, 2015

(30) Foreign Application Priority Data

May 23, 2014 (JP) ................... 2014-107441

(51) Int. Cl.
*H01M 4/13* (2010.01)
*H01M 4/38* (2006.01)
(Continued)

(52) U.S. Cl.
CPC ............ *H01M 4/386* (2013.01); *H01G 11/06* (2013.01); *H01G 11/24* (2013.01); *H01G 11/50* (2013.01);
(Continued)

(58) Field of Classification Search
CPC .... H01M 4/366; H01M 10/052; H01M 4/386; H01M 4/48; H01M 10/0525; H01M 4/13;
(Continued)

(56) References Cited

U.S. PATENT DOCUMENTS

| | | |
|---|---|---|
| 7,776,473 B2 | 8/2010 | Aramata et al. |
| 8,835,047 B2 | 9/2014 | Morita et al. |

(Continued)

FOREIGN PATENT DOCUMENTS

| | | |
|---|---|---|
| CN | 101047234 A | 10/2007 |
| CN | 103022438 A | 4/2013 |

(Continued)

OTHER PUBLICATIONS

Park.C et al., "Characterizations and electrochemical behaviors of disproportionated SiO and its composite for rechargeable Li-ion batteries", J. Mater. Chem. (Journal of Materials Chemistry), May 10, 2010, vol. 20, No. 23, pp. 4854-4860.

(Continued)

*Primary Examiner* — Gary Harris
(74) *Attorney, Agent, or Firm* — Nixon Peabody LLP; Jeffrey L. Costellia

(57) ABSTRACT

A power storage device with high capacity is provided. Alternatively, a power storage device with excellent cycle characteristics is provided. Alternatively, a power storage device with high charge and discharge efficiency is provided. Alternatively, a power storage device with a long lifetime is provided. A negative electrode active material includes a first region and a second region. The first region includes at least one element selected from Si, Mg, Ca, Ga, Al, Ge, Sn, Pb, Sb, Bi, Ag, Zn, Cd, As, Hg, and In. The second region includes oxygen and the same element as the one included in the first region. The crystallite size of the element included in the first region is larger than or equal to 1 nm and smaller than or equal to 10 nm.

19 Claims, 38 Drawing Sheets

(51) Int. Cl.
*H01M 4/48* (2010.01)
*H01M 10/0525* (2010.01)
*H01G 11/50* (2013.01)
*H01M 4/134* (2010.01)
*H01M 4/36* (2006.01)
*H01M 10/052* (2010.01)
*H01G 11/06* (2013.01)
*H01G 11/24* (2013.01)
*H01M 4/02* (2006.01)

(52) U.S. Cl.
CPC ............ *H01M 4/13* (2013.01); *H01M 4/134* (2013.01); *H01M 4/366* (2013.01); *H01M 4/38* (2013.01); *H01M 4/48* (2013.01); *H01M 10/052* (2013.01); *H01M 10/0525* (2013.01); *H01M 2004/027* (2013.01); *Y02E 60/13* (2013.01)

(58) Field of Classification Search
CPC .. H01M 4/134; H01M 4/38; H01M 2004/027; H01G 11/24; H01G 11/50; H01G 11/06
USPC .......... 429/219, 218.1, 222, 225, 229, 231.6
See application file for complete search history.

(56) References Cited

U.S. PATENT DOCUMENTS

| | | |
|---|---|---|
| 2003/0053945 A1 | 3/2003 | Fukuoka et al. |
| 2004/0234856 A1 | 11/2004 | Morigaki et al. |
| 2007/0224508 A1 | 9/2007 | Aramata et al. |
| 2010/0075227 A1 | 3/2010 | Morita et al. |
| 2013/0078490 A1 | 3/2013 | Morita et al. |
| 2013/0149605 A1 | 6/2013 | Kakehata et al. |
| 2014/0099539 A1 | 4/2014 | Yamazaki et al. |

FOREIGN PATENT DOCUMENTS

| | | | |
|---|---|---|---|
| JP | 2007-059213 A | | 3/2007 |
| JP | 2007-294423 A | | 11/2007 |
| JP | 2010-073651 A | | 4/2010 |
| JP | 2010-170943 A | | 8/2010 |
| JP | 2010170943 A | * | 8/2010 |
| JP | 2013-073764 A | | 4/2013 |
| JP | 2013-235811 A | | 11/2013 |
| JP | 2014-229583 A | | 12/2014 |
| JP | 2015-002036 A | | 1/2015 |
| JP | 2015-072809 A | | 4/2015 |
| JP | 2015-088462 A | | 5/2015 |
| JP | 2015-111547 A | | 6/2015 |
| KR | 2007-0096933 A | | 10/2007 |
| WO | WO-2014/156117 | | 10/2014 |
| WO | WO-2014/188851 | | 11/2014 |
| WO | WO-2014/192225 | | 12/2014 |
| WO | WO-2014/199554 | | 12/2014 |
| WO | WO-2015/025443 | | 2/2015 |

OTHER PUBLICATIONS

International Search Report (Application No. PCT/IB2015/053186) dated Aug. 11, 2015.

Written Opinion (Application No. PCT/IB2015/053186) dated Aug. 11, 2015.

Yamada.M et al., "Reaction Mechanism of "SiO"-Carbon Composite-Negative Electrode for High-Capacity Lithium-Ion Batteries", J. Electrochem. SOC. (Journal of the Electrochemical Society), 2012, vol. 159, No. 10, pp. A1630-A1635.

Yamamura.H et al., "Investigation of the irreversible reaction mechanism and the reactive trigger on SiO anode material for lithium-ion battery", Journal of the Ceramic Society of Japan J. Ceram. Soc. Jpn.(Journal of the Ceramic Society of Japan), 2011, vol. 119, No. 1395, pp. 855-860.

\* cited by examiner

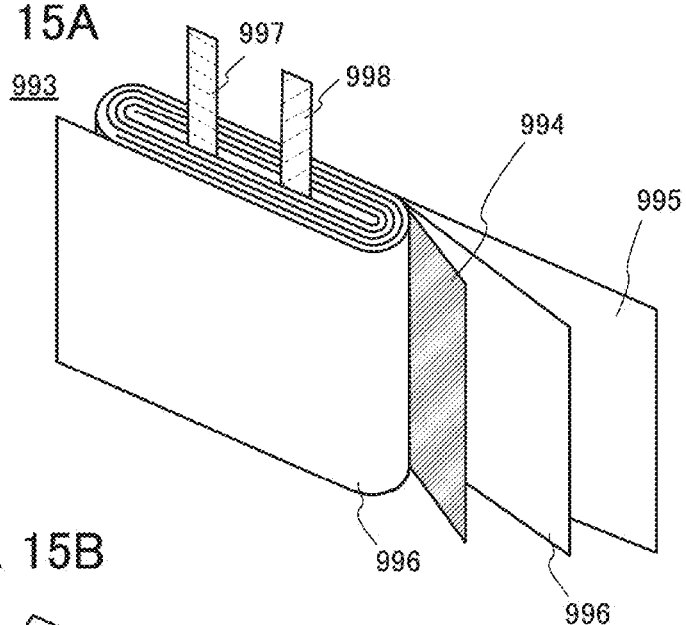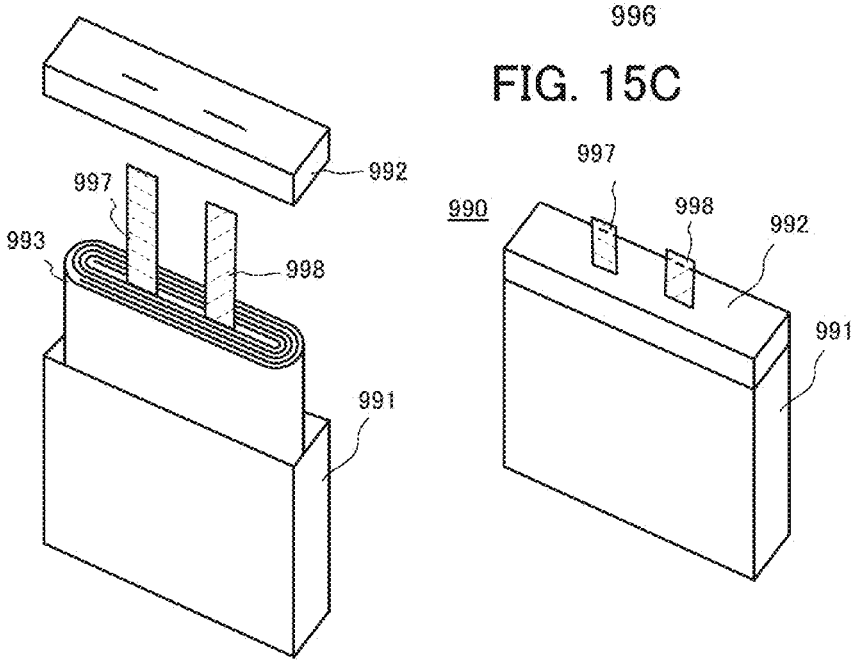

FIG. 17A1 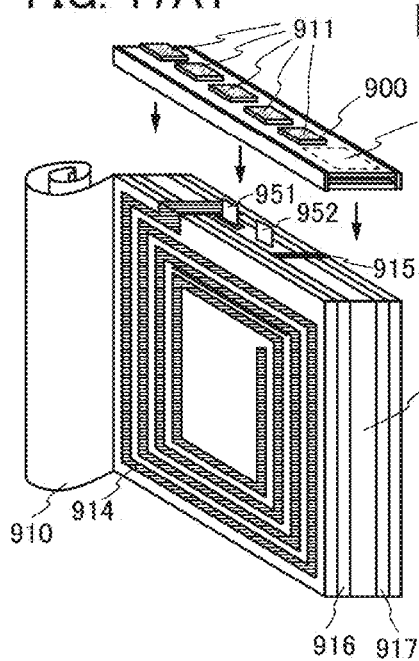 FIG. 17A2 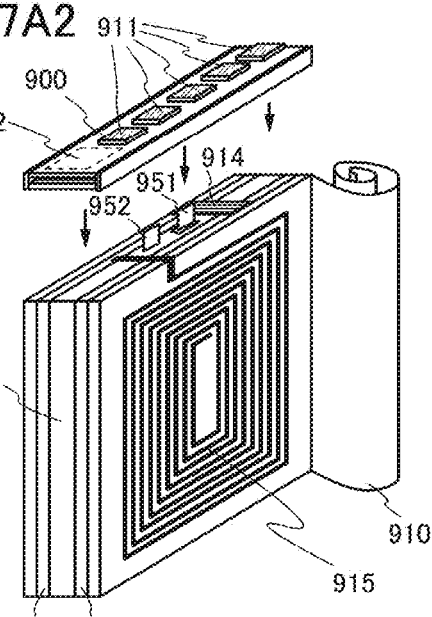
FIG. 17B1 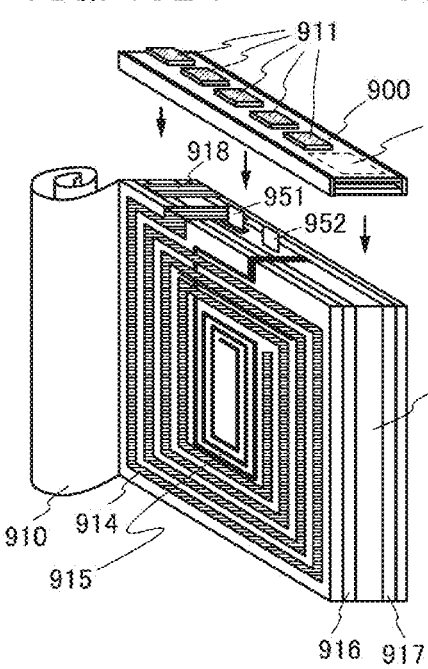 FIG. 17B2 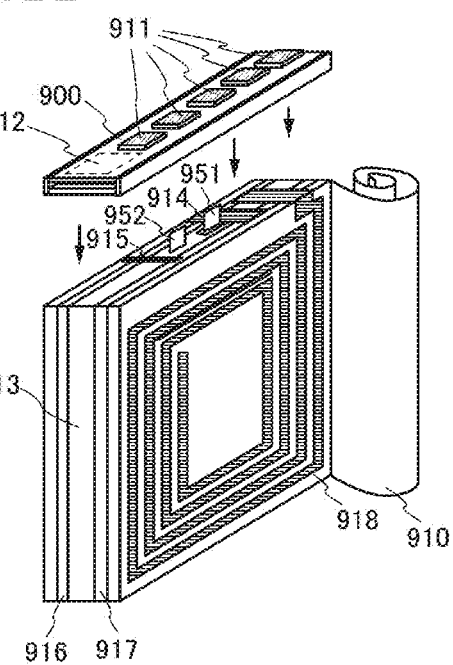

FIG. 23A
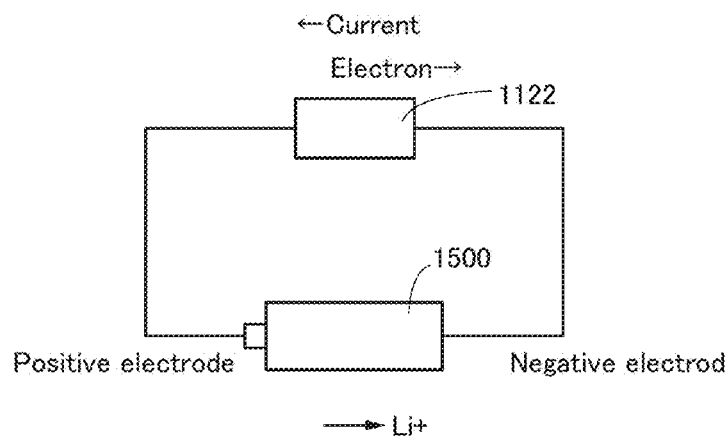
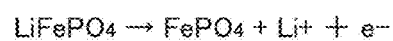 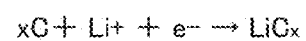
LiFePO₄ → FePO₄ + Li+ + e−    xC + Li+ + e− → LiC$_x$
                                $x \geq 6$
FIG. 23B
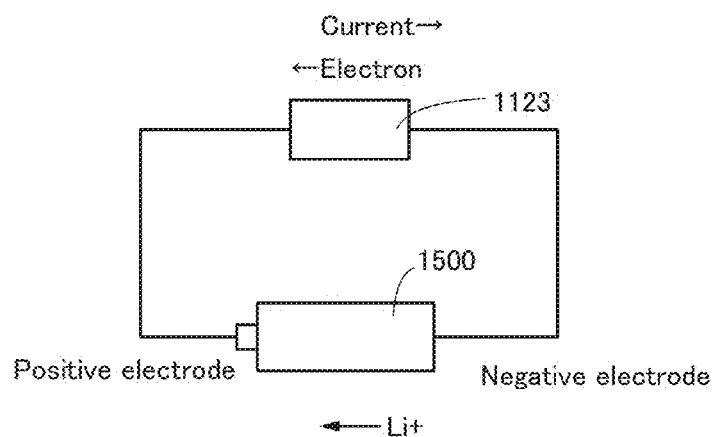
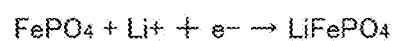 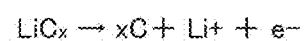
FePO₄ + Li+ + e− → LiFePO₄    LiC$_x$ → xC + Li+ + e−
                                $x \geq 6$ 10μm 5μm 10μm

US 10,026,959 B2

NEGATIVE ELECTRODE ACTIVE MATERIAL INCLUDING FIRST, SECOND, AND THIRD REGIONS AND POWER STORAGE DEVICE INCLUDING THE NEGATIVE ELECTRODE ACTIVE MATERIAL

TECHNICAL FIELD

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

BACKGROUND ART

In recent years, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

There is a very great need for more compact and higher capacity lithium-ion secondary batteries. Thus, electrodes formed of an alloy-based material of silicon, tin, or the like, instead of a carbon material such as graphite (black lead) which has been conventionally used as a negative electrode active material, have been actively developed. The (graphite has a theoretical capacity of 372 mAh/g, whereas the negative electrode of silicon has a dramatically high theoretical capacity of 4200 mAh/g, and therefore silicon is an optimal material for higher capacity lithium-ion secondary batteries.

However, when the material that is alloyed and dealloyed with lithium (e.g., silicon) greatly expands and contracts with reception and release of carrier ions in charge and discharge cycles; therefore, when the amount of carrier ions received by the material increases, the contact states between an active material and a conductive additive, between active materials, and between an active material and a current collector become worse and a conductive path is lost in some cases. The loss of the conductive path decreases the capacity as charge and discharge cycles increase. Moreover, in some cases, silicon is deformed or broken to be separated from a current collector or pulverized, so that a function as a lithium-ion secondary battery becomes difficult to maintain.

Patent Document 1 discloses a silicon layer that is formed over an uneven current collector so that a stress due to expansion or contraction of the silicon is reduced.

REFERENCE

Patent Document

[Patent Document 1] Japanese Published Patent Application No. 2013-235811

DISCLOSURE OF INVENTION

An object of one embodiment of the present invention is to provide a power storage device having high capacitance. Another object of one embodiment of the present invention is to provide a power storage device with excellent cycle characteristics. Another object of one embodiment of the present invention is to provide a power storage device with high charge and discharge efficiency. An object of one embodiment of the present invention is to provide a long-life power storage device.

An object of one embodiment of the present invention is to reduce or inhibit the decomposition reaction of an electrolytic solution, which speeds up at high temperature, and to prevent a decrease in charge and discharge capacity in charging and discharging at high temperature, in order to extend the operating temperature range of a power storage device. An object of one embodiment of the present invention is to provide a novel power storage device.

In the case where a power storage device such as a secondary battery is used in a flexible display device, a flexible electronic device, or the like, the power storage device is provided in a flexible portion (part or the whole of a housing). In this case, the power storage device is bent with the flexible portion, so that repeated change in the form of the power storage device might cause separation between a current collector and an active material in the power storage device. As a result, deterioration of the power storage device might be promoted.

Another object of one embodiment of the present invention is to prevent deterioration of a power storage device caused by change in its form.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a negative electrode active material including a first region and a second region. The first region includes at least one element selected from Si, Mg, Ca, Ga, Al, Ge, Sn, Pb, Sb, Bi, Ag, Zn, Cd, As, Hg, and In. The second region includes oxygen and the same element as the one included in the first region. The crystallite size of the element included in the first region is larger than or equal to 1 nm and smaller than or equal to 10 nm. The second region may include oxide of the same element as the one included in the first region. Here, the crystallite size of the element included in the first region means the crystallite size of a single crystal, a polycrystal, or a microcrystal of the element included in the first region.

Another embodiment of the present invention is a negative electrode active material including silicon and silicon oxide. The crystallite size of silicon included in the negative electrode active material is larger than or equal to 1 nm and smaller than or equal to 10 nm.

Another embodiment of the present invention is a negative electrode active material including silicon and silicon oxide. The average particle size of the negative electrode active material is preferably larger than or equal to 30 nm and smaller than or equal to 30 μm, more preferably larger than or equal to 100 nm and smaller than or equal to 20 μm, further preferably larger than or equal to 500 nm and smaller than or equal to 10 μm, or still further preferably larger than or equal to 1 μm and smaller than or equal to 6 μm. The crystallite size of silicon included in the negative electrode active material is larger than or equal to 1 nm and smaller than or equal to 10 nm.

The crystallite size in the above structures is preferably obtained by an X-ray diffraction method.

Another embodiment of the present invention is a negative electrode active material including silicon and silicon oxide. When the atomic ratio of silicon and oxygen of the silicon oxide is expressed as Si:O=x:y, the silicon oxide includes a region of x<y.

Another embodiment of the present invention is a power storage device including the negative electrode active material described in any one of the above paragraphs. The power storage device includes a positive electrode and a negative electrode. The negative electrode includes a negative electrode current collector and the negative electrode active material. The negative electrode active material is between the negative electrode current collector and the positive electrode. In this structure, silicon included in the negative electrode active material is preferably in contact with the negative electrode current collector. In addition, in this structure, silicon oxide included in the negative electrode active material is preferably in contact with the negative electrode current collector.

One embodiment of the present invention can provide a power storage device having high capacitance. One embodiment of the present invention can provide a power storage device with excellent cycle characteristics. One embodiment of the present invention can provide a power storage device with high charge and discharge efficiency. One embodiment of the present invention can provide a long-life power storage device.

One embodiment of the present invention makes it possible to reduce or inhibit the decomposition reaction of an electrolytic solution, which speeds up at high temperature, and to prevent a decrease in charge and discharge capacity in charge and discharge at high temperature, so that the operating temperature range of a power storage device can be extended. One embodiment of the present invention can provide a novel power storage device.

One embodiment of the present invention can prevent deterioration of a power storage device caused by change in its form.

Note that the description of these effects does not disturb the existence of other effects. In one embodiment of the present invention, there is no need to obtain all the effects. Other effects will be apparent from and can be derived from the description of the specification, the drawings, the claims, and the like.

BRIEF DESCRIPTION OF DRAWINGS

In the accompanying drawings:
FIGS. 15A to 15C illustrate an example of a storage battery;
FIGS. 17A1, 17A2, 17B1, and 17B2 illustrate an example of a power storage system;
FIGS. 23A and 23B show operation of a secondary battery.

BEST MODE FOR CARRYING OUT THE INVENTION

Figure 1A:
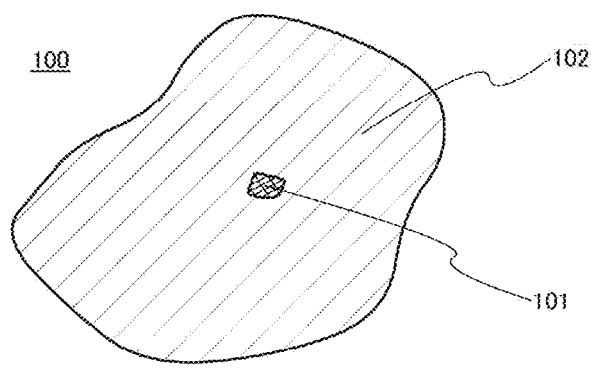
FIGS. 1A to 1C illustrate an active material of one embodiment of the present invention.

Hereinafter, embodiments and examples of the present invention will be described in detail with reference to the accompanying drawings. However, the present invention is not limited to the descriptions of the embodiments and examples and it is easily understood by those skilled in the art that the mode and details can be changed variously.

Accordingly, the present invention should not be interpreted as being limited to the content of the embodiments and examples below.

Note that in the drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is used for portions having similar functions, and the portions are not especially denoted by reference numerals in some cases.

Note that in this specification and the like, a positive electrode and a negative electrode for a power storage device may be collectively referred to as an electrode; in this case, the electrode in this case refers to at least one of the positive electrode and the negative electrode.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

Here, a charge rate and a discharge rate will be described. For example, in the case of charging a secondary battery with a capacity of X [Ah] at a constant current, a charge rate of 1 C means the current value I [A] with which charging is terminated in exactly 1 hour, and a charge rate of 0.2 C means I/5 [A] (i.e., the current value with which charging is terminated in exactly 5 hours). Similarly, a discharge rate of 1 C means the current value I [A] with which discharging is ended in exactly 1 hour, and a discharge rate of 0.2 C means I/5 [A] (i.e., the current value with which discharging is ended in exactly 5 hours).

Embodiment 1

In this embodiment, a negative electrode active material of one embodiment of the present invention is described.

In the case where silicon, a material alloyed and dealloyed with lithium, is used as a negative electrode active material, a capacity can be increased compared with the case where graphite, a conventional negative electrode active material, is used. Graphite has a theoretical capacity of 372 mAh/g, whereas silicon has a theoretical capacity of 4200 mAh/g, that is over ten times as much as that of graphite.

However, a material that is alloyed and dealloyed with lithium (e.g., silicon) greatly expands and contracts with reception and release of carrier ions in charge and discharge cycles; therefore, when the amount of carrier ions received by the material increases, deformation or a crack would be generated. Then, the active material might be separated from a current collector or pulverized, which might lead to difficulty of maintaining a function for a lithium-ion secondary battery. Pulverization means that a material is repeatedly broken into pieces because of expansion and contraction, for example. If the material is pulverized, the material might be separated from the current collector, a separated piece thereof might get stuck in a gap of a separator or might attached to a surface of a positive electrode, or phenomena like that might occur. Moreover, because of the expansion and the contraction, the contact states between an active material and a conductive additive, between active materials, and between an active material and a current collector become worse and a conductive path is lost in some cases. The loss of the conductive path decreases the capacity as charge and discharge cycles increase.

The reaction potential of the negative electrode active material is preferably as low as possible, in which case the voltage of the power storage device can be high. On the other hand, when the reaction potential is low, power of reducing an electrolyte is increased, so that an organic solvent or the like in an electrolyte might be subjected to reductive decomposition. The range of potentials in which the electrolysis of an electrolyte does not occur is referred to as a potential window. The electrode potential of the negative electrode needs to be within a potential window of an electrolyte; however, the potentials of many active materials used for negative electrodes of lithium-ion secondary batteries and lithium-ion capacitors are out of the potential windows of almost all kinds of electrolytes. Specifically, materials with low reaction potentials, such as graphite and silicon, can increase the voltage of storage batteries but are likely to cause the reductive decomposition of electrolytes, which is problematic.

Note that in this specification and the like, an electrolytic solution including a solvent and salts is referred to as an electrolyte in some cases.

To suppress deformation or a crack of the negative electrode active material due to expansion and contraction caused by reception and release of carrier ions, it is preferred to reduce a particle size of the negative electrode active material, for example. When the particle size of the negative electrode active material is reduced, a surface area per unit weight of the negative electrode active material is increased.

Meanwhile, a reaction between the electrolyte and the negative electrode active material occurs at the surface of the negative electrode active material. Therefore, as the surface area per unit weight of the negative electrode active material increases, the amount of the reaction between the negative electrode active material and the electrolyte increases.

An active material of one embodiment of the present invention includes a first region which expands and contracts by a reaction with carrier ions, and a second region positioned between the first region and an electrolyte. The second region is a region having small reactivity with carrier ions, whereby decomposition of the electrolyte is suppressed and deformation and a crack of the active material due to the reaction with carrier ions are also suppressed.

A negative electrode active material of one embodiment of the present invention includes a first region and a second region. A particle of a negative electrode active material of one embodiment of the present invention preferably includes a first region and a second region.

The second region is preferably in contact with a surface of the negative electrode active material at least partly. The second region is preferably positioned to surround the first region.

The first region includes a material that reacts with carrier ions. The first region is preferably a single crystal, or may have an amorphous region in contact with the periphery of the single crystal. The first region may become amorphous after a reaction with carrier ions. Alternatively, the first region may be a polycrystal.

It is preferred that carrier ions can pass through the second region. The second region preferably has higher resistance than the first region. When the second region surrounds the first region, an area of the first region in contact with the electrolyte can be reduced. Compared with the case where the first region contacts with the electrolyte, decomposition of the electrolyte can be suppressed in the case where the second region contacts with the electrolyte because the resistance in the second region is higher than that in the first region.

In addition, reactivity with carrier ions in the second region is preferably smaller than that in the first region. A capacity per unit weight or per unit volume in the second region is preferably smaller than that in the first region. When the second region reacts with carrier ions, expansion and contraction due to the reaction with carrier ions in the second region are preferably milder than those in the first region. Because the expansion and contraction in the second region is mild, the second region can reduce a stress change of the active material caused by the expansion and contraction in the first region.

The second region is preferably amorphous. The second region may contain an element that would be a carrier ion after reaction with carrier ions.

FIG. 1A is a schematic view illustrating a negative electrode active material of one embodiment of the present invention. A cross-sectional view of the negative electrode active material is shown in FIG. 1A. The cross-sectional view shows a cut surface at which the negative electrode active material is cut. In the example in FIG. 1A, a negative electrode active material 100 has a particle-like shape. The negative electrode active material 100 includes a first region 101 and a second region 102.

Figure 1B:
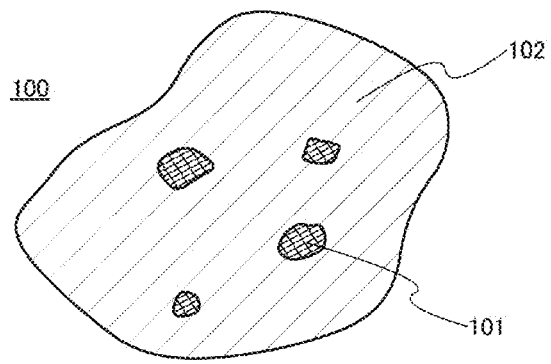

FIG. 1B shows an example where the first regions 101 are scattered in the negative electrode active material 100. As shown in FIG. 1B, there can be a plurality of first regions 101. Similarly, there can be a plurality of second regions 102.

Figure 1C:
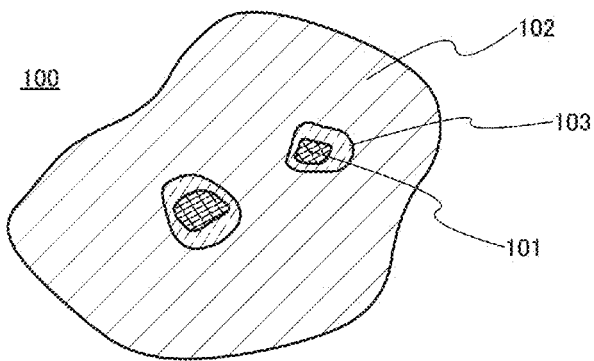

Alternatively, as shown in FIG. 1C, the negative electrode active material 100 may include a third region 103 that surrounds the first region 101. Here, the third region 103 is preferably in contact with the first region 101.

FIGS. 1A to 1C show examples where the negative electrode active material 100 has the particle-like shape; however, the negative electrode active material 100 may have a plate-like shape, for example.

Figure 2A:
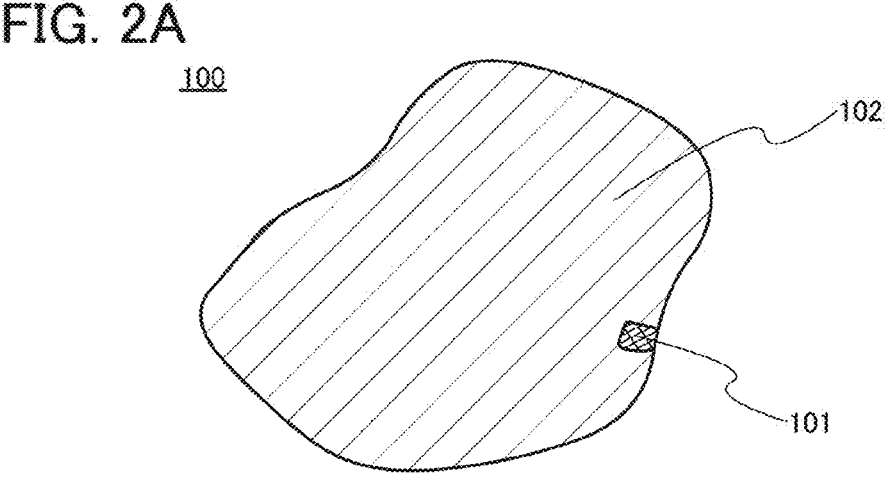
FIGS. 2A and 2B illustrate an active material of one embodiment of the present invention.
Figure 2B:
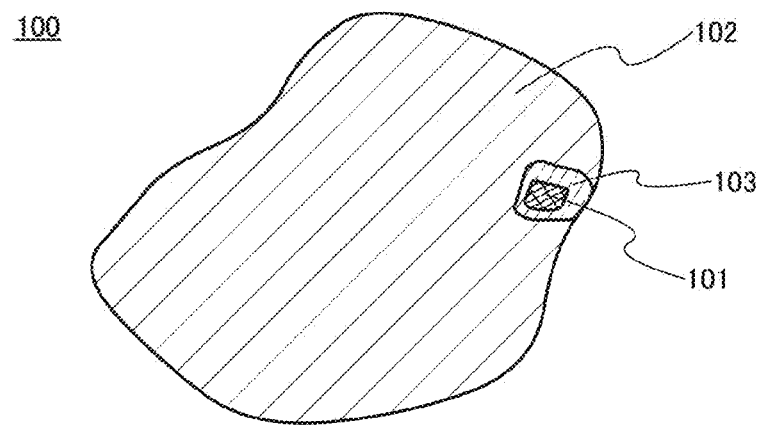

Although it is acceptable that part of the first region 101 is in contact with a surface of the negative electrode active material 100 as shown in FIG. 2A, it is preferred that the first region 101 be not in contact with the surface as shown in FIGS. 1A and 1B. Alternatively, as shown in FIG. 2B, the third region 103 may be included to surround the first region 101.

When the negative electrode active material 100 has the particle-like shape, the particle size is preferably larger than or equal to 30 nm and smaller than or equal to 30 μm, more preferably larger than or equal to 100 nm and smaller than or equal to 20 μm, further preferably larger than or equal to 500 nm and smaller than or equal to 10 μm, or still further preferably larger than or equal to 1 μm and smaller than or equal to 6 μm, for example. The particle size means, for example, a diameter of a sphere whose volume is equal to the volume of the particle, or a diameter of a circle whose area is equal to the area of the cross-section surface of the particle. The particle size may be calculated by a laser diffraction and scattering method or the like.

The first region of the negative electrode active material 100 preferably contains at least one of Si, Mg, Ca, Ga, Al, Ge, Sn, Pb, Sb, Bi, Ag, Zn, Cd, As, Hg, and In, for example. These elements each have a higher capacity than carbon. In particular, silicon has a high theoretical capacity of 4200 mAh/g. Therefore, silicon is preferably included in the first region of the negative electrode active material 100.

The first region of the negative electrode active material 100 may include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, or the like.

Alternatively, for the first region of the negative electrode active material 100, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$), or $Li_{3-x}M_xN$ (M=Co, Ni, or Cu) with a $Li_3N$ structure, which is a nitride containing lithium and a transition metal, can be used.

The second region of the negative electrode active material 100 preferably includes a compound including the same element as the one in the first region. For example, the second region may include oxide of the same element as the one included in the first region. Alternatively, the second region may include nitride, sulfide, phosphide, fluoride, or the like of the same element as the one included in the first region. Alternatively, the second region preferably includes oxygen and the same element as the one included in the first region.

For example, the first region of the negative electrode active material 100 may include at least one element selected from Si, Mg, Ca, Ga, Al, Ge, Sn, Pb, Sb, Bi, Ag, Zn, Cd, As, Hg, and In, and the second region may include oxide of the same element as the one included in the first region. For example, the first region and the second region of the negative electrode active material of one embodiment of the present invention include Si and silicon oxide, respectively. Alternatively, the first region and the second region of the negative electrode active material of one embodiment of the present invention include Sn and a tin oxide, respectively.

When the first region and the second region contain at least one element selected from Si, Mg, Ca, Ga, Al, Ge, Sn, Pb, Sb, Bi, Ag, Zn, Cd, As, Hg, and In, concentration of the element in the first region is preferably higher than that in the second region.

The negative electrode active material 100 may include a material which causes a conversion reaction in the first region or the second region. For example, transition metal oxide which does not cause an alloying reaction with lithium, such as cobalt oxide (CoO), nickel oxide (NiO), or iron oxide (FeO), may be used for the negative electrode active material. Other examples of the material which causes a conversion reaction include oxide such as $Fe_2O_3$, CuO, $Cu_2O$, $RuO_2$, and $Cr_2O_3$, sulfide such as $CoS_{0.89}$, NiS, and CuS, nitride such as $Zn_3N_2$, $Cu_3N$, and $Ge_3N_4$, phosphide such as $NiP_2$, $FeP_2$, and $CoP_3$, and fluoride such as $FeF_3$ and $BiF_3$.

The first region 101 and the second region 102 of the negative electrode active material 100 include, for example, Si and silicon oxide, respectively. The third region that surrounds the first region 101 may be included in the negative electrode active material 100. Here, the third region may include, for example, amorphous silicon.

A plurality of negative electrode active materials may be used. For example, the negative electrode active material 100 and a second negative electrode active material that includes a different material from the negative electrode active material 100 may be used. Alternatively, three or more active materials may be used in combination.

For example, one or more of the above-mentioned materials that can be used for the negative electrode active material 100 may be used as the second active material.

The second active material may include, for example, a carbon-based material. Examples of the carbon-based material include graphite, graphitizing carbon (soft carbon), non-graphitizing carbon (hard carbon), a carbon nanotube, graphene, carbon black, and the like. Examples of the graphite include artificial graphite such as meso-carbon microbeads (MCMB), coke-based artificial graphite, or pitch-based artificial graphite and natural graphite such as spherical natural graphite.

For the second active material, $Li_{3-x}M_xN$ (M is Co, Ni, or Cu) with a $Li_3N$ structure, which is a nitride including lithium and a transition metal, can be used. For example, $Li_{2.6}Co_{0.4}N_3$ is preferable because of high charge and discharge capacity (900 mAh/g and 1890 mAh/cm$^3$). A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

[Method for Forming Negative Electrode Active Material]

An example of a method for forming the negative electrode active material 100 is described below. Here, a method for forming the negative electrode active material 100 where Si is included in the first region and silicon oxide is included in the second region is explained.

A non-uniform concentration gradient is made by, for example, performing heat treatment or the like on a composition including silicon and oxygen, to form the first region and the second region. For example, at least part of the composition including silicon and oxygen is melted and then solidified, whereby silicon concentration is non-uniformly distributed. That is, the first region with high silicon concentration and the second region with lower silicon concentration than in the first region can be formed.

SiO powder can be used as the composition including silicon and oxygen, for example.

The composition including silicon and oxygen may be formed by an evaporation method, a sputtering method, a chemical vapor deposition (CVD) method, or the like.

When a sputtering method is used, the composition including silicon and oxygen can be formed using silicon as a target and oxygen as a gas. Alternatively, a silicon oxide can be used as a target.

Here, the first region is preferably microcrystal of silicon, for example.

The heat treatment is performed with the use of a furnace, for example. The temperature of the heat treatment is preferably higher than or equal to 800° C. and lower than or equal to 1400° C., or more preferably higher than or equal to 900° C. and lower than or equal to 1200° C., for example.

The heat treatment time is preferably longer than or equal to 30 minutes and shorter than or equal to 20 hours, or more preferably longer than or equal to 1 hour and shorter than or equal to 5 hours, for example. The temperature rising rate is preferably higher than or equal to 50° C./hour and lower than or equal to 1000° C./hour, or more preferably higher than or equal to 100° C./hour and lower than or equal to 500° C./hour, for example. The temperature falling rate is higher than or equal to 50° C./hour and lower than or equal to 500° C./hour, for example. Alternatively, a sample may be rapidly cooled when put in the atmosphere at room temperature after the heat treatment. The atmosphere for the heat treatment is an inert atmosphere, for example. As the inert atmosphere, a rare gas such as argon or a gas such as nitrogen or hydrogen is used, for example. Alternatively, a mixed gas of them or an oxygen atmosphere may be used. The pressure is an atmosphere pressure or a reduced pressure (a pressure lower than the atmosphere pressure), for example.

Alternatively, heating may be performed by laser light. When laser light is used, the melted composition including silicon and oxygen may be rapidly cooled. By rapid cooling of the composition including silicon and oxygen after meltage, smaller silicon crystals can be discretely formed in some cases. Alternatively, more largely distorted silicon can be formed by rapid cooling in some cases. The laser light may be excimer laser light with a wavelength of 400 nm or less or the second harmonic or the third harmonic of YAG laser or $YVO_4$ laser, for example.

[Measurement by XRD]

A crystal structure of a substance can be estimated by X-ray diffraction. In addition, the lattice constant and the crystallite size can be calculated from an obtained diffraction spectrum.

Here, the negative electrode active material of one embodiment of the present invention is assumed to include an element A (A is at least one of elements selected from Si, Mg, Ca, Ga, Al, Ge, Sn, Pb, Sb, Bi, Ag, Zn, Cd, As, Hg, and In), and an X-ray diffraction spectrum of the negative electrode active material of one embodiment of the present invention is assumed to be measured. Analysis on the obtained X-ray diffraction spectrum is performed under assumption that the negative electrode active material of one embodiment of the present invention includes a crystal of the element A, whereby the crystallite size z [nm] of the element A can be calculated. The analysis range of the X-ray diffraction is approximately 15 mmϕ, for example. Therefore, the obtained crystallite size z of the element A is estimated to be an average of data within a range of 15 mmϕ.

Here, the crystallite size z is preferably larger than or equal to 1 nm and smaller than or equal to 10 nm, or larger than or equal to 2 nm and smaller than or equal to 5 nm.

As the crystallite size is smaller, the stress due to expansion and contraction caused by a reaction with carrier ions can be reduced, for example. Therefore, a crack or deformation of the negative electrode active material by charging or discharging can be suppressed. Thus, a decrease in capacity caused by charge and discharge cycles can be reduced. That is, a power storage device manufactured with the use of the negative electrode active material can have a long lifetime.

This embodiment can be implemented in appropriate combination with any of the other embodiments.

Embodiment 2

In this embodiment, an electrode including the negative electrode active material shown in Embodiment 1 is described.

[Structure of Negative Electrode]

Figure 3A:
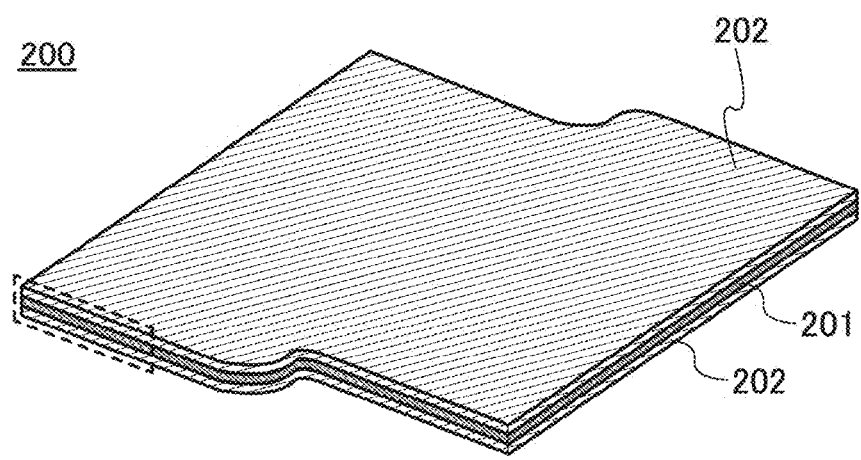
FIGS. 3A and 3B illustrate a negative electrode of one embodiment of the present invention.
Figure 3B:
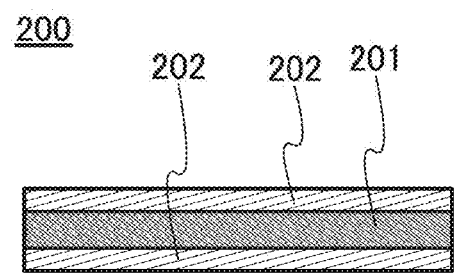

FIG. 3A is an overhead view of a negative electrode 200, and FIG. 3B is a cross-sectional view of a portion surrounded by a dashed line in FIG. 3A. The negative electrode 200 has a structure in which a negative electrode active material layer 202 is provided over a negative electrode current collector 201. Although the negative electrode active material layers 202 are provided so that the negative electrode current collector 201 is sandwiched therebetween in FIGS. 3A and 3B, the negative electrode active material layer 202 may be formed over only one surface of the negative electrode current collector 201. The negative electrode active material layer 202 includes a negative electrode active material. For the negative electrode active material, the negative electrode active material shown in Embodiment 1 can be used.

There is no particular limitation on the negative electrode current collector 201 as long as it has high conductivity without causing a significant chemical change in a power storage device. For example, the negative electrode current collector 201 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used to form the current collectors. Alternatively, the negative electrode current collector 201 can be formed using an aluminum alloy to which an element which improves heat resistance, such as silicon, neodymium, scandium, or molybdenum, is added. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 201 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The negative electrode current collector 201 may be formed to have micro irregularities on the surface thereof in order to enhance adhesion to the active material layer. The negative electrode current collector 201 preferably has a thickness of more than or equal to 5 μm and less than or equal to 30 μm.

The negative electrode active material layer 202 contains a negative electrode active material. An active material refers only to a material that relates to insertion and extraction of ions that are carriers. In this specification and the like, a material that is actually an "active material" and materials such as a conductive additive, a binder, and the like are collectively referred to as an active material layer.

The negative electrode active material layer 202 may include a conductive additive. Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fibers of copper, nickel, aluminum, silver, gold, or the like, a conductive ceramic material, or the like can be used.

Flaky graphene has the excellent electrical characteristic of high conductivity and the excellent physical properties of high flexibility and high mechanical strength. For this reason, the use of graphene as the conductive additive can increase the points and the area where the negative electrode active materials are in contact with each other.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. When graphene contains oxygen, the proportion of oxygen in the graphene, which is measured by X-ray photoelectron spectroscopy (XPS), is higher than or equal to 2 at. % and lower than or equal to 20 at. %, preferably higher than or equal to 3 at. % and lower than or equal to 15 at. %.

The negative electrode active material layer 202 may include a binder.

As the binder, a material such as polyimide, polyvinylidene fluoride (PVdF), polystyrene, poly(methyl acrylate), poly(methyl methacrylate) (PMMA), sodium polyacrylate, polyvinyl alcohol (PVA), polyethylene oxide (PEO), polypropylene oxide, polyvinyl chloride, polytetrafluoroethylene, polyethylene, polypropylene, isobutylene, polyethylene terephthalate, nylon, or polyacrylonitrile (PAN) can be used.

As the binder, water-soluble polymers can be used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, or ethylene-propylene-diene copolymer can be used. Any of these rubber materials is more preferably used in combination with the aforementioned water-soluble polymers.

A single binder may be used or plural kinds of binders may be used in combination.

[Method 1 for Forming Negative Electrode]

Next, a method for forming the negative electrode 200 is described.

In order to form the negative electrode active material layer 202, slurry is formed first. The slurry can be formed in such a manner that the above-described material for the negative electrode active material to which a conductive additive, a binder, and the like are added as appropriate is mixed with a solvent, for example. As the solvent, for example, water or N-methyl-2-pyrrolidone (NMP) can be used. Water is preferably used in terms of the safety and cost.

The mixing can be performed with a mixer. Here, any of a variety of mixers can be used as the mixer. For example, a planetary mixer, a homogenizer, or the like can be used.

The negative electrode current collector 201 may be subjected to surface treatment. Examples of such surface treatment are corona discharge treatment, plasma treatment, and undercoat treatment. The surface treatment can increase the wettability of the negative electrode current collector 201 with respect to the slurry. In addition, the adhesion between the negative electrode current collector 201 and the negative electrode active material layer 202 can be increased.

Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered mark), and a carbon nanotube.

Then, the formed slurry is applied to the negative electrode current collector 201.

For the application, a slot die method, a gravure method, a blade method, or combination of any of them can be used, for example.

Then, the solvent is volatilized from the slurry applied to the negative electrode current collector 201 by a method such as ventilation drying or reduced pressure (vacuum) drying, whereby the negative electrode active material layer 202 is formed. The solvent is preferably volatilized using, for example, a hot wind at a temperature higher than or equal to 30° C. and lower than or equal to 160° C. Alternatively, the solvent may be volatilized using a hot plate or the like. There is no particular limitation on the atmosphere.

The thickness of the negative electrode active material layer 202 formed in the above-described manner is preferably greater than or equal to 5 μm and less than or equal to 300 μm, or more preferably greater than or equal to 10 μm and less than or equal to 150 μm, for example. The amount of the active material in the negative electrode active material layer 202 is preferably greater than or equal to 1 mg/cm$^2$ and less than or equal to 30 mg/cm$^2$, for example.

Note that the negative electrode active material layer 202 may be formed over only one surface of the negative electrode current collector 201, or the negative electrode active material layers 202 may be formed such that the negative electrode current collector 201 is sandwiched therebetween. Alternatively, the negative electrode active material layers 202 may be formed such that part of the negative electrode current collector 201 is sandwiched therebetween.

The negative electrode active material layer 202 may be pressed by a compression method such as a roll press method or a flat plate press method so as to be consolidated.

Through the above steps, the negative electrode active material layer 202 can be formed.

Note that the negative electrode active material layer 202 may be predoped. There is no particular limitation on the method for predoping the negative electrode active material layer 202. For example, the negative electrode active material layer 202 may be predoped electrochemically. For example, before the battery is assembled, the negative electrode active material layer 202 can be predoped with lithium in an electrolytic solution described later with the use of a lithium metal as a counter electrode.

[Method 2 for Forming Negative Electrode]

Here, as a more specific example of the method for forming the negative electrode 200, an example of using SiO powder as a negative electrode active material is described.

As the binder, the above-described binder can be used. Here, polyimide (PI), accurately a precursor of polyimide, is used as the binder. As the conductive additive, the above-mentioned conductive additive can be used. In this example, acetylene black is used as the conductive additive.

The proportion of the weight of the binder to the total weight of the active material, the binder, and the conductive additive is preferably higher than or equal to 3 weight % and lower than or equal to 50 weight %, or more preferably higher than or equal to 5 weight % and lower than or equal to 20 weight %. The proportion of the weight of the conductive additive to the total weight is preferably higher than or equal to 0.5 weight % and lower than or equal to 40 weight %, more preferably higher than or equal to 2 weight % and lower than or equal to 15 weight %.

First, SiO powder for the negative electrode active material and acetylene black (AB) are mixed, and a solvent is added bit by bit while stirring is performed, so that a mixture is obtained. As the solvent, NMP is used. When the viscosity of the mixture is adjusted to be high by adding a small amount of NMP, mixing (kneading) with a mixer later can be performed on the mixture with high viscosity. The kneading can weaken cohesion of the SiO powder. In addition, dispersibility of SiO powder and AB can be increased.

Next, the obtained mixture is mixed with a mixer.

Next, the precursor of polyimide and NMP are added to the mixture subjected to the mixing, and mixing is further performed with a mixer, so that the slurry to be applied to the electrode is obtained. The proportion of the solid content of the slurry is preferably higher than or equal to 35 weight % and lower than or equal to 85 weight %, or more preferably higher than or equal to 45 weight % and lower than or equal to 80 weight %, for example. The proportion of the solid content means the proportion of the weight of materials other than the solvent to the total weight of the slurry.

Here, the mixing order of the materials is not limited to the one described above. For example, the negative electrode active material, the conductive additive, and the binder may be mixed at a time.

After formed through the above steps, the slurry is applied to the negative electrode current collector 201. Then, the solvent is volatilized to obtain the negative electrode. The description in Method 1 for forming negative electrode is referred to for the application and the volatilization.

[Method 3 for Forming Negative Electrode]

As another example of the method for forming the negative electrode 200, an example using SiO powder and graphite for the negative electrode active material is shown. As the graphite, artificial graphite is used here. As the artificial graphite, mesocarbon microbeads, carbonaceous mesophase, or the like can be used. The surface area of the graphite is preferably larger than or equal to 1 m$^2$/g and smaller than or equal to 20 m$^2$/g, or more preferably larger than or equal to 1 m$^2$/g and smaller than or equal to 10 m$^2$/g.

As the binder, the above-described binder can be used. In this example, CMC-Na and SBR are used as the binder. The polymerization degree of CMC-Na is preferably, for example, higher than or equal to 100 and lower than or equal to 1000, more preferably higher than or equal to 500 and lower than or equal to 900, or still more preferably higher than or equal to 600 and lower than or equal to 800.

As the conductive additive, the above-described conductive additive can be used. In this example, carbon fiber is used as the conductive additive.

The proportion of the weight of CMC-Na to the total weight of the active material, the binder, and the conductive additive is preferably, for example, higher than or equal to 1 weight % and lower than or equal to 7 weight %. The proportion of the weight of SBR to the total weight is preferably, for example, higher than or equal to 1 weight % and lower than or equal to 7 weight %.

In addition, the proportion of graphite to SiO is preferably higher than or equal to 3 weight % and lower than or equal to 15 weight %.

First, the SiO powder and the graphite for the negative electrode active material, the carbon fiber, and the CMC-Na powder are mixed with a mixer. Next, water is added as a solvent and kneading is performed. The kneading means mixing on a mixture with high viscosity. The kneading can weaken cohesion of the active material. In addition, dispersibility in the active material and among the active material, the conductive additive, and CMC-Na can be increased.

Here, the mixing order of the materials is not limited to the one described above. For example, it is acceptable that only the carbon fiber and the active material are mixed first, and then the CMC-Na powder is added thereto.

Next, an SBR aqueous dispersion liquid is added to the mixture, and mixing is performed with a mixer. Here, water may be further added as the solvent.

Furthermore, water as the solvent is added to the mixture so that the mixture has certain viscosity, and mixing is performed with a mixer to obtain the slurry to be applied to the electrode. The proportion of the solid content of the slurry is preferably higher than or equal to 30 weight % and lower than or equal to 80 weight %, or more preferably higher than or equal to 40 weight % and lower than or equal to 70 weight %, for example.

After formed through the above steps, the slurry is applied to the negative electrode current collector 201. Then the solvent is volatilized to obtain the negative electrode. The description in Method 1 for forming negative electrode is referred to for the application and the volatilization.

This embodiment can be implemented in appropriate combination with any of the other embodiments.

Embodiment 3

In this embodiment, an example of a power storage device using the electrode shown in Embodiment 2 is described.

[Thin Storage Battery]

Figure 5:
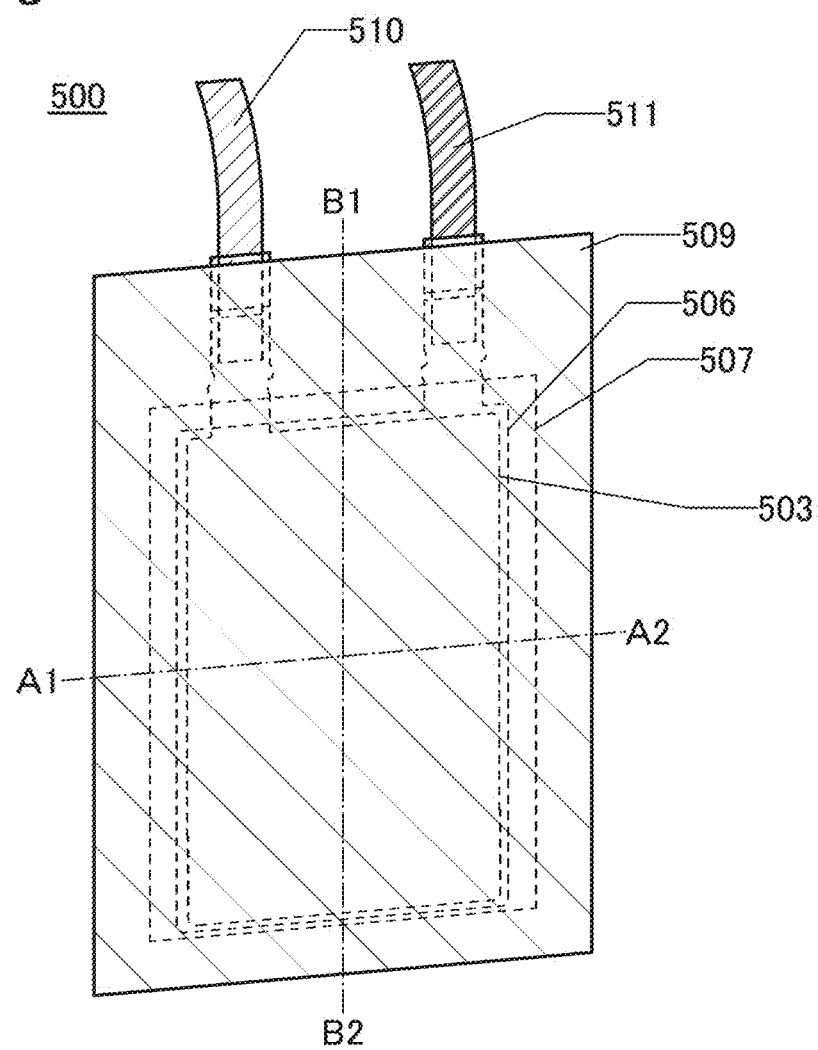
FIG. 5 is an external view of a thin storage battery.

FIG. 5 illustrates a thin storage battery as an example of a power storage device. When a flexible thin storage battery is used in an electronic device at least part of which is flexible, the storage battery can be bent as the electronic device is bent.

Figure 6A:
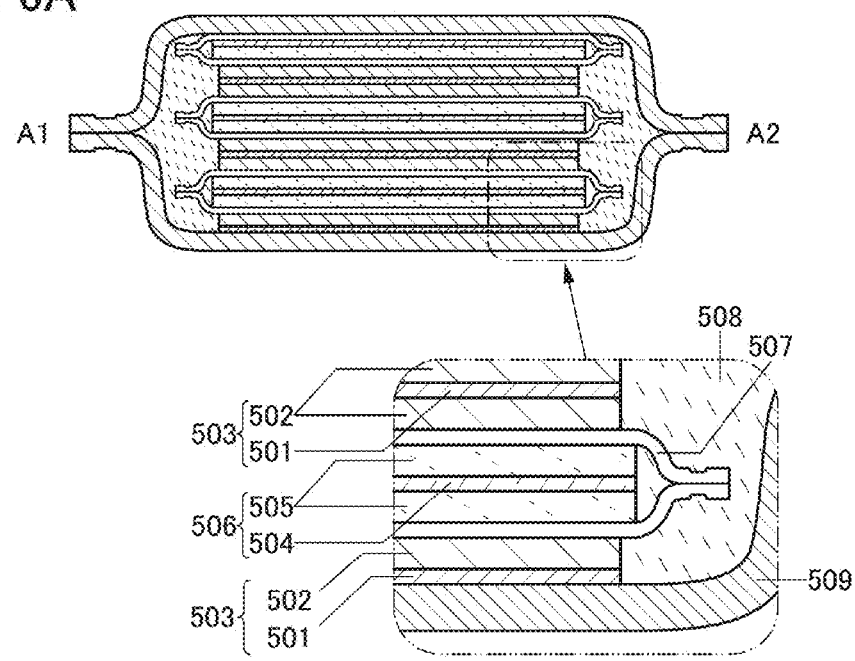
FIGS. 6A and 6B are cross sectional views of a thin storage battery.
Figure 6B:
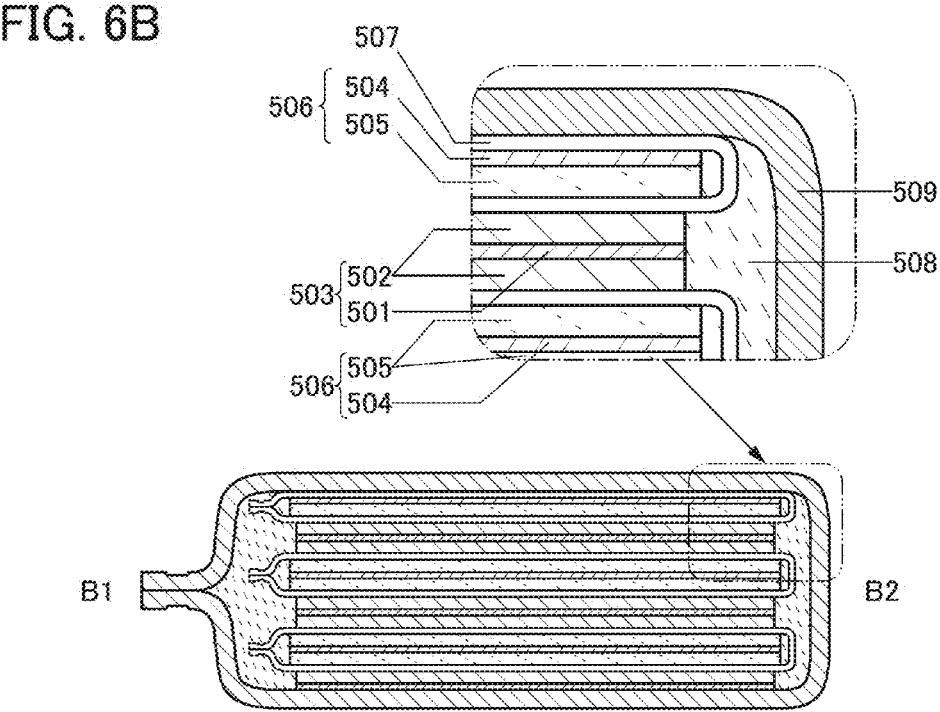

FIG. 5 illustrates the appearance of a thin storage battery 500. FIG. 6A is a cross-sectional view taken along dashed-dotted line A1-A2 in FIG. 5, and FIG. 6B is a cross-sectional view taken along dashed-dotted line B1-B2 in FIG. 5. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508. The positive electrode active material layer 502 and the negative electrode active material layer 505 face each other with the separator 507 therebetween. In the storage battery 500 shown in FIGS. 6A and 6B, there are five pairs of the positive electrode active material layer 502 and the negative electrode active material layer 505 that face each other.

The negative electrode active material layer 505 includes the negative electrode active material shown in Embodiment 1. For the negative electrode 506, the negative electrode shown in Embodiment 2 is preferably used.

[Operation of Storage Battery]

Here, operation of a storage battery will be described.

Here, the operating principle of a secondary battery is described using a lithium-ion secondary battery as an example. Here, for example, $LiFePO_4$ and graphite are used as a positive electrode active material and a negative electrode active material, respectively.

FIG. 23A illustrates connections between a lithium-ion secondary battery 1500 and a charger 1122 when the lithium-ion secondary battery is charged. In the case of charging the lithium-ion secondary battery, a reaction expressed by Formula 1 occurs in a positive electrode.

$LiFePO_4 \rightarrow FePO_4 + Li^+ + e^-$  [Formula 1]

In addition, a reaction expressed by Formula 2 occurs in the negative electrode.

$xC + Li^+ + e^- \rightarrow LiC_x \; x \geq 6$  [Formula 2]

FIG. 23B illustrates connections between the lithium-ion secondary battery 1500 and a load 1123 in the case of discharging the lithium-ion secondary battery. In the case of discharging the lithium-ion secondary battery, a reaction expressed by Formula 3 occurs in the positive electrode.

$FePO_4 + Li^+ + e^- \rightarrow LiFePO_4$  [Formula 3]

In addition, a reaction expressed by Formula 4 occurs in the negative electrode.

$LiC_x \rightarrow xC + Li^+ + e^- \; x \geq 6$  [Formula 4]

Next, components of the storage battery are explained. First, the structure of the negative electrode 506 is described. For the negative electrode 506, the negative electrode shown in Embodiment 2 is preferably used. For the negative electrode current collector 504, the negative electrode current collector 201 shown in Embodiment 2 can be used. For the negative electrode active material layer 505, the negative electrode active material layer 202 shown in Embodiment 2 can be used.

[Structure of Positive Electrode]

Next, a structure of the positive electrode 503 will be described. The positive electrode 503 includes the positive electrode current collector 501 and the positive electrode active material layer 502.

There is no particular limitation on the positive electrode current collector 501 as long as it has high conductivity without causing a significant chemical change in a power storage device. For example, the positive electrode current collector 501 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used to form the current collector. Alternatively, the positive electrode current collector 501 can be formed using an aluminum alloy to which an element which improves heat resistance, such as silicon, neodymium, scandium, or molybdenum, is added. The positive electrode current collector 501 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The positive electrode current collector 501 may be formed to have micro irregularities on the surface thereof in order to enhance adhesion to the active material layer. The positive electrode current collector 501 preferably have a thickness of more than or equal to 5 μm and less than or equal to 30 μm.

The positive electrode active material layer 502 includes a positive electrode active material. As described above, an "active material" refers only to a material that relates to insertion and extraction of ions functioning as carriers. In this specification and the like, however, a layer including a conductive additive, a binder, or the like as well as a material that is actually a "active material" is also referred to as an active material layer.

As the positive electrode active material, a material into and from which lithium ions can be inserted and extracted can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

Further, lithium-containing complex phosphate ($LiMPO_4$ (general formula) (M is one or more of Fe(II), Mn(II), Co(II), and Ni(II))) can be used. Typical examples of $LiMPO_4$ are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\le1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\le1$, $0<c<1$, $0<d<1$, and $0<e<1$), and $LiFe_fNi_gCo_hMn_iPO_4$ ($f+g+h+i\le1$, $0<<1$, $0<g<1$, $0<h<1$, and $0<i<1$).

Further, a lithium-containing complex silicate such as $Li_{(2-j)}MSiO_4$ (general formula) (M is one or more of Fe(II), Mn(II), Co(II), and Ni(II) and $0\le j\le2$) can be used. Typical examples of $Li_{(2-j)}MSiO_4$ (general formula) are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\le1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\le1$, $0<m<1$, $0<n<1$, and $0<q<1$), and $Li_{(2-j)}Fe_rNi_sCo_tMn_uSiO_4$ ($r+s+t+u\le1$, $0<r<1$, $0<s<1$, $0<t<1$, and $0<u<1$).

Still alternatively, a NASICON compound represented by a general formula, $A_xM_2(XO_4)_3$ (A is Li, Na, or Mg, M is Fe, Mn, Ti, V, Nb, or Al, and X is S, P, Mo, W, As, or Si), can be used as the positive electrode active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average particle size of the positive electrode active material is preferably, for example, larger than or equal to 5 nm and smaller than or equal to 50 μm.

For example, lithium-containing complex phosphate having an olivine crystal structure used for the positive electrode active material has a one-dimensional lithium diffusion path, so that lithium diffusion is slow. The average particle size of the active material is thus preferably, for example, larger than or equal to 5 nm and smaller than or equal to 1 μm in order to increase speed of charging and discharging. The specific surface area of the active material is, for example, preferably greater than or equal to 10 $m^2/g$ and less than or equal to 50 $m^2/g$.

A positive electrode active material having an olivine crystal structure is much less likely to be changed in the crystal structure by charge and discharge and has a more stable crystal structure than, for example, an active material having a layered rock-salt crystal structure. Thus, a positive electrode active material having an olivine crystal structure is stable toward operation such as overcharge. The use of such a positive electrode active material allows fabrication of a highly safe power storage device.

The positive electrode active material layer 502 may include a conductive additive. As the conductive additive, any of the materials shown in the description of the structure of the negative electrode in Embodiment 1 can be used, for example.

The positive electrode active material layer 502 may include a binder. As the binder, any of the materials shown in the description of the structure of the negative electrode in Embodiment 1 can be used, for example.

Here, the positive electrode active material layer 502 may contain graphene. Graphene is capable of making low-resistance surface contact and has extremely high conductivity even with a small thickness. Therefore, even a small amount of graphene can efficiently form a conductive path in an active material layer.

Here, for example, lithium-containing complex phosphate with an olivine crystal structure used for the positive electrode active material has a one-dimensional lithium diffusion path, so that lithium diffusion is slow. The average size of particles of the active material is thus, for example, preferably greater than or equal to 5 nm and less than or equal to 1 μm so that the charge and discharge rate is increased. The specific surface area of the active material is, for example, preferably greater than or equal to 10 $m^2/g$ and less than or equal to 50 $m^2/g$.

In the case where such an active material with a small average particle size (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount be used.

Figure 4:
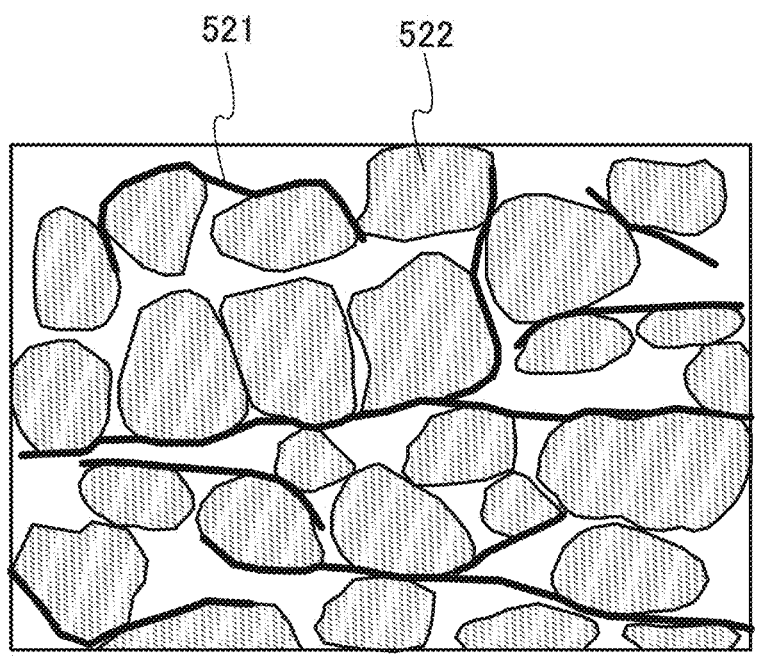
FIG. 4 illustrates an electrode of one embodiment of the present invention.

FIG. 4 is a longitudinal cross-sectional view of the positive electrode active material layer 502 in the case of using graphene as the conductive additive. The positive electrode active material layer 502 includes positive electrode active material particles 522, graphene flakes 521 as the conductive additive, and the binder (not illustrated in the drawing).

The longitudinal section of the positive electrode active material layer 502 in FIG. 4 shows substantially uniform dispersion of the graphene flakes 521 in the positive electrode active material layer 502. The graphene flakes 521 are schematically shown by thick lines in FIG. 4 but are actually thin films each having a thickness corresponding to the thickness of a single layer or a multi-layer of carbon molecules. The plurality of graphene flakes 521 are formed in such a way as to wrap, coat, or adhere to the surfaces of the plurality of positive electrode active material particles 522, so that the graphene flakes 521 make surface contact with the positive electrode active material particles 522. Furthermore, the graphene flakes 521 are also in surface contact with each other; consequently, the plurality of graphene flakes 521 form a three-dimensional network for electric conduction.

This is because graphene oxide with extremely high dispersibility in a polar solvent is used for the formation of the graphene flakes 521. The solvent is removed by volatilization from a dispersion medium in which graphene oxide is uniformly dispersed, and the graphene oxide is reduced to graphene; hence, the graphene flakes 521 remaining in the positive electrode active material layer 502 partly overlap with each other and are dispersed such that surface contact is made, thereby forming an electrical conduction path.

Unlike a conventional conductive additive in the form of particles, such as acetylene black, which makes point contact with an active material, the graphene flake 521 is capable of making low-resistance surface contact; accordingly, the electrical conduction between the positive electrode active material particles 522 and the graphene flakes 521 can be improved without an increase in the amount of a conductive additive. Thus, the proportion of the positive electrode active material particles 522 in the positive electrode active material layer 502 can be increased. Accordingly, the discharge capacity of a storage battery can be increased.

[Formation Method of Positive Electrode]

Next, a method for forming the positive electrode 503 will be described.

The positive electrode 503 can be formed in a way similar to that of forming the negative electrode shown in Embodiment 2. For example, a solvent is added to the active material, the conductive additive, the binder, and the like and they are mixed to make slurry, and then the slurry is applied and the solvent is volatilized, so that the positive electrode 503 is formed.

Note that the positive electrode active material layer 502 may be formed over only one surface of the positive electrode current collector 501, or the positive electrode active material layers 502 may be formed such that the positive electrode current collector 501 is sandwiched therebetween. Alternatively, the positive electrode active material layers 502 may be formed such that part of the positive electrode current collector 501 is sandwiched therebetween.

The positive electrode current collector 501 may be subjected to surface treatment. Examples of such surface treatment are corona discharge treatment, plasma treatment, and undercoat treatment. The surface treatment increases the wettability of the positive electrode current collector 501 to the positive electrode paste. In addition, the adhesion between the positive electrode current collector 501 and the positive electrode active material layer 502 can be increased.

After volatilization of the solvent, the obtained positive electrode active material layer 502 may be pressed by a compression method such as a roll press method or a flat plate press method so as to be consolidated.

The thickness of the positive electrode active material layer 502 formed in the above-described manner is preferably greater than or equal to 5 μm and less than or equal to 300 μm, more preferably greater than or equal to 10 μm and less than or equal to 150 μm, for example. The amount of the active material in the positive electrode active material layer 502 is preferably greater than or equal to 2 mg/cm$^2$ and less than or equal to 50 mg/cm$^2$, for example.

Next, an example of a method for forming the positive electrode in which graphene is used as the conductive additive is described. First, the active material, the binder, and graphene oxide are prepared. Though the example of forming the positive electrode is shown here, the negative electrode shown in Embodiment 2 can be made in the same manner with the use of graphene as the conductive additive, for example.

The graphene oxide is a raw material of the graphene flakes 521 that serves as a conductive additive later. Graphene oxide can be formed by various synthesis methods such as a Hummers method, a modified Hummers method, and oxidation of graphite. Note that a method for forming a storage battery electrode of the present invention is not limited by the degree of separation of graphene oxide.

For example, the Hummers method is a method for forming graphite oxide by oxidizing graphite such as flake graphite. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

The length of one side (also referred to as a flake size) of the graphene oxide is greater than or equal to 50 nm and less than or equal to 100 μm, preferably greater than or equal to 800 nm and less than or equal to 20 μm. Particularly in the case where the flake size is smaller than the average particle size of the positive electrode active material particles 522, the surface contact with a plurality of the positive electrode active material particles 522 and connection between graphene flakes become difficult, resulting in difficulty in improving the electrical conductivity of the positive electrode active material layer 502.

A solvent is added to the graphene oxide, the active material, and the binder, and mixing is performed. As the solvent, water or a polar organic solvent such as N-methylpyrrolidone (NMP) or dimethylformamide can be used.

Note that graphene oxide may be contained at a proportion higher than or equal to 0.1 weight % and lower than or equal to 10 weight %, preferably higher than or equal to 0.1 weight % and lower than or equal to 5 weight %, further preferably higher than or equal to 0.2 weight % and lower than or equal to 1 weight % of the total weight of the mixture of the graphene oxide, the positive electrode active material, the conductive additive, and the binder. On the other hand, the graphene obtained after the positive electrode paste is applied to the current collector and reduction is performed may be contained at a proportion higher than or equal to 0.05 weight % and lower than or equal to 5 weight %, preferably higher than or equal to 0.05 weight % and lower than or equal to 2.5 weight %, further preferably higher than or equal to 0.1 weight % and lower than or equal to 0.5 weight % of the total weight of the positive electrode active material layer. This is because the weight of the graphene is reduced by almost half due to the reduction of the graphene oxide.

Note that a solvent may be further added after the mixing so that the viscosity of the mixture can be adjusted. The mixing and the addition of the polar solvent may be repeated plural times. By the above steps, the slurry to be applied to the electrode is obtained.

Next, the obtained slurry is applied onto a current collector.

Then, the solvent is volatilized from the slurry applied to the positive electrode current collector 501 by a method such as ventilation drying or reduced pressure (vacuum) drying, whereby the positive electrode active material layer 502 is formed. The volatilization of the solvent is preferably performed using, for example, a hot wind at a temperature higher than or equal to 50° C. and lower than or equal to 160° C. There is no particular limitation on the atmosphere.

Next, reduction of the graphene oxide is preferably performed. The reduction is performed by heat treatment or with the use of a reducing agent, for example.

An example of a reducing method using a reducing agent will be described below. First, a reaction is caused in a solvent containing a reducing agent. Through this step, the graphene oxide contained in the active material layer is reduced to form the graphene flakes 521. Note that oxygen in the graphene oxide is not necessarily entirely released and possibly remains in the graphene partly. When graphene flakes 521 contains oxygen, the ratio of oxygen measured by XPS in graphene is higher than or equal to 2 atomic % and lower than or equal to 20 atomic %, preferably higher than or equal to 3 atomic % and lower than or equal to 15 atomic %. This reduction treatment is preferably performed at higher than or equal to room temperature and lower than or equal to 150° C.

Examples of the reducing agent are ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof.

A polar solvent can be used as the solvent. Any material can be used for the polar solvent as long as it can dissolve the reducing agent. Examples of the material of the polar solvent are water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

After that, washing and drying are performed to volatilize the solvent. The solvent is preferably volatilized under a reduced pressure (in vacuum) or in a reduction atmosphere. The volatilization step of the solvent is preferably performed, for example, in vacuum at a temperature higher than or equal to 50° C. and lower than or equal to 160° C. for longer than or equal to 10 minutes and shorter than or equal to 48 hours. The treatment allows evaporation, volatilization, or removal of the polar solvent and moisture in the positive electrode active material layer 502. The volatilization of the solvent may be followed by pressing.

Alternatively, the solvent may be volatilized using a drying furnace or the like. In the case of using a drying furnace, the heat treatment is performed at 30° C. or higher and 200° C. or lower for longer than or equal to 30 seconds and shorter than or equal to 20 minutes, for example. The temperature may be increased in stages.

Note that heating can facilitate the reduction reaction caused using the reducing agent. After volatilization of the solvent following the chemical reduction, heating may further be performed.

In the case of not performing reduction with the use of a reducing agent, reduction can be performed by heat treatment. For example, reduction by heat treatment can be performed under a reduced pressure (in vacuum) at a temperature higher than or equal to 150° C. for longer than or equal to 0.5 hours and shorter than or equal to 30 hours.

Through the above steps, the positive electrode active material layer 502 in which the positive electrode active material particles 522 and the graphene flakes 521 are uniformly dispersed can be formed.

Here, reduction is preferably performed on an electrode using graphene oxide. It is more preferred that reduction be performed in such a manner that chemical reduction and thermal reduction are performed in this order. In thermal reduction, oxygen atoms are released in the form of, for example, carbon dioxide. In contrast, in chemical reduction, reduction is performed using a chemical reaction, whereby the proportion of carbon atoms that form an $sp^2$ bond of graphene can be high. Furthermore, thermal reduction is preferably performed after chemical reduction, in which case the conductivity of formed graphene can be further increased.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolytic solution, safety against liquid leakage and the like is improved. Further, a secondary battery can be thinner and more lightweight. Typical examples of the gelled high-molecular material include a silicone gel, an acrylic gel, an acrylonitrile gel, a poly (ethylene oxide)-based gel, a poly(propylene oxide)-based gel, a gel of a fluorine-based polymer, and the like.

Alternatively, the use of one or more of ionic liquids (room temperature molten salts) which are less likely to burn and volatilize as the solvent for the electrolytic solution can prevent the power storage device from exploding or catching fire even when the power storage device internally shorts out or the internal temperature increases due to overcharging or the like. An ionic liquid is composed of a cation and an anion, and includes an organic cation and an anion. Examples of the organic cation used for the electrolytic solution are aliphatic onium cations, such as a quaternary ammonium cation, a tertiary sulfonium cation, and a quaternary phosphonium cation, and aromatic cations, such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for the power storage device is preferably a highly purified one so as to contain a negligible amount of dust particles and elements other than the constituent elements of the electrolytic solution (hereinafter, also simply referred to as impurities). Specifically, the proportion of the weight of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used. Examples of the gelled electrolyte (polymer-gel electrolyte) include a host polymer which is used as a support and contains the electrolytic solution described above.

Examples of the host polymer are explained below. Examples of the host polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. In the case of using the solid electrolyte, a separator or a spacer is not necessary. Further, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

[Fabricating Method of Thin Storage Battery]

Figure 7A:
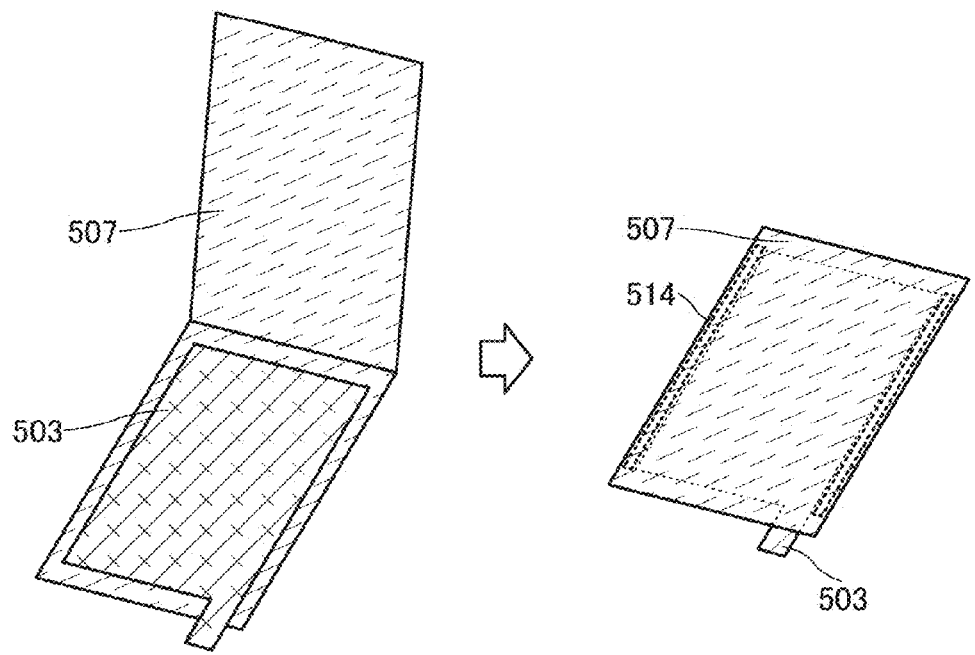
FIGS. 7A and 7B show a method for fabricating a thin storage battery.

A method for fabricating the storage battery is described below. The separator 507 is preferably formed to have a bag-like shape to surround one of the positive electrode 503 and the negative electrode 506. For example, as illustrated in FIG. 7A, the separator 507 is folded in two such that the positive electrode 503 is sandwiched, and sealed with a sealing member 514 in a region outside the region overlapping with the positive electrode 503; thus, the positive electrode 503 can be surely surrounded by the separator 507. Then, as illustrated in FIG. 7B, the positive electrodes 503 surrounded by the separators 507 and the negative electrodes 506 are alternately stacked and provided in the exterior body 509, whereby the thin storage battery 500 can be formed.

Figure 8A:
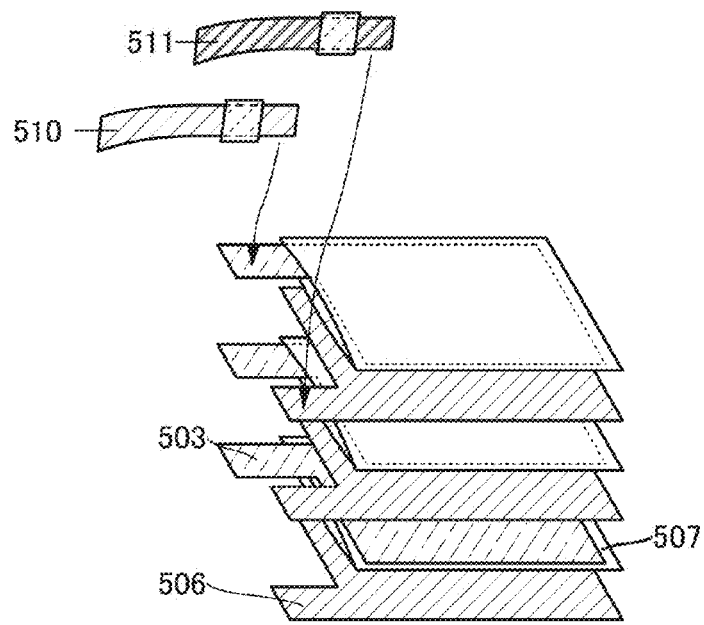
FIGS. 8A and 8B show a method for fabricating a thin storage battery.
Figure 8B:
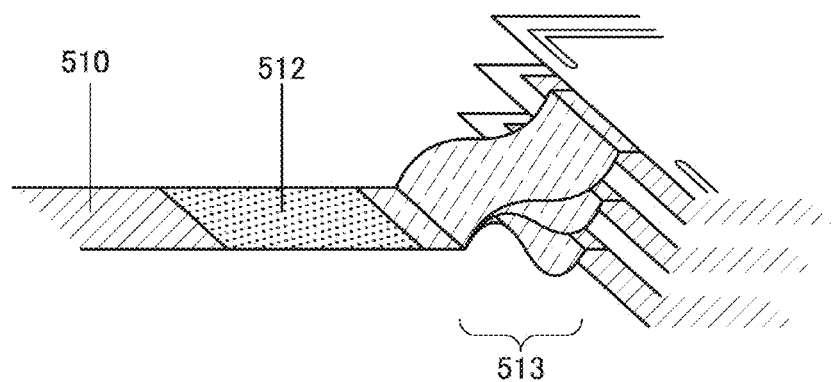

FIG. 8B illustrates an example in which a current collector is welded to a lead electrode, specifically, an example where positive electrode current collectors 501 are welded to a positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 8B, and it is therefore possible to relieve stress due to external force applied after fabrication of the storage battery 500. The reliability of the storage battery 500 can be thus increased.

In the thin storage battery 500 illustrated in FIGS. 7A and 7B and FIGS. 8A and 8B, the positive electrode current collectors 501 and the negative electrode current collectors 504 are welded to the positive electrode lead electrode 510 and a negative electrode lead electrode 511, respectively, by ultrasonic welding such that part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged such that part of the positive electrode current collector 501 and part of the negative electrode current collector 504 are exposed to the outside the exterior body 509 without using lead electrodes.

Figure 7B:
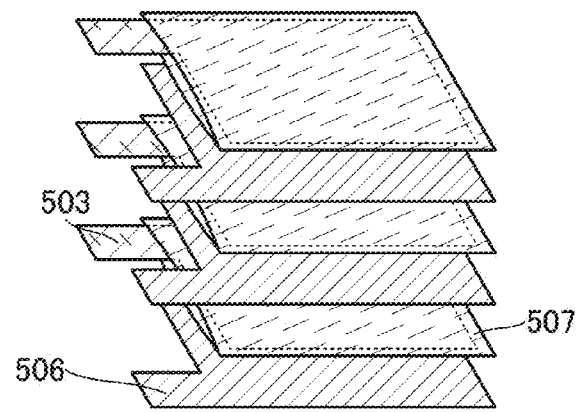
Figure 9:
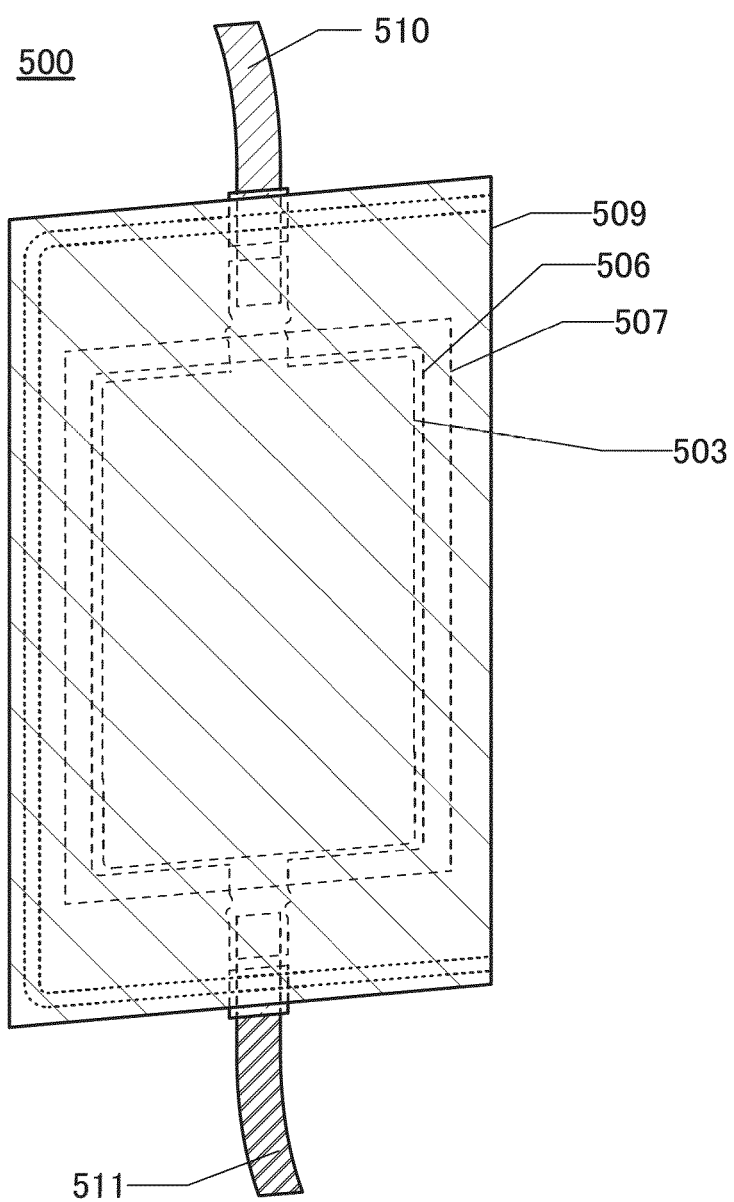
FIG. 9 shows a method for fabricating a thin storage battery.

Although the positive electrode lead electrode 510 and the negative electrode lead electrode 511 are provided on the same side in FIGS. 7A and 7B, the positive electrode lead electrode 510 and the negative electrode lead electrode 511 may be provided on different sides as illustrated in FIG. 9. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, production efficiency of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

In FIGS. 6A and 6B and FIG. 7B, five pairs of a positive electrode and a negative electrode facing each other are illustrated as an example. Needless to say, the number of a pair of electrodes facing each other is not limited to 5 and may be more than 5 or less than 5. In the case of a large number of electrode layers, the storage battery can have high capacity. In contrast, in the case of a small number of electrode layers, the storage battery can have small thickness and high flexibility.

In the above structure, the exterior body 509 of the secondary battery can change its form with a radius of curvature greater than or equal to 30 mm, preferably greater than or equal to 10 mm. The exterior body of the secondary battery is formed of one or two films. In the case of the secondary battery having a layered structure, a cross-sectional structure of the battery that is bent is surrounded by two curves of the film serving as the exterior body.

Figure 10A:
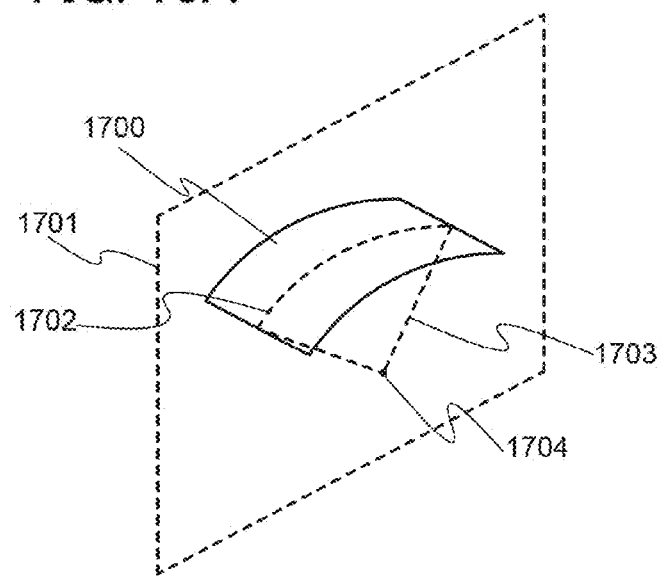
FIGS. 10A to 10C illustrate the radius of curvature on a plane.
Figure 10B:
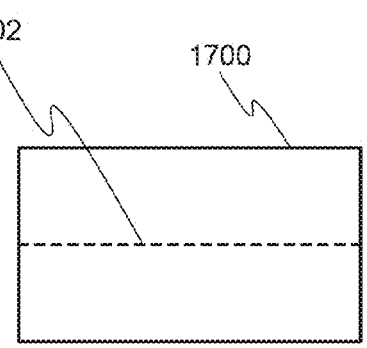
Figure 10C:
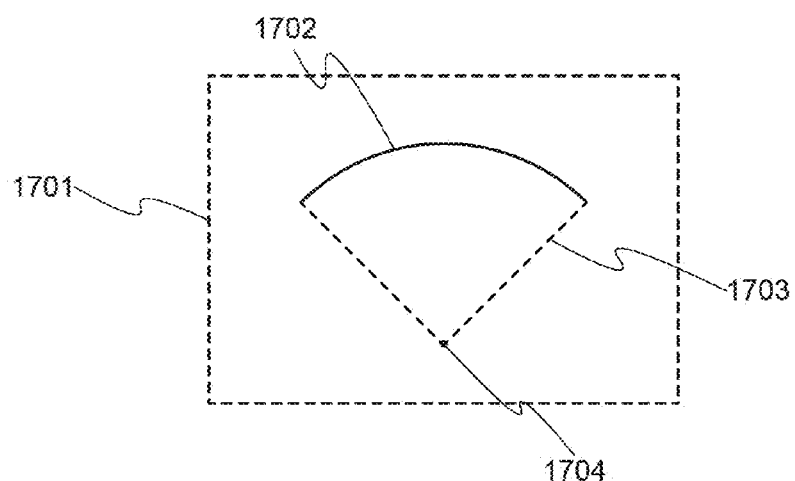

A description is given of the radius of curvature of a surface with reference to FIGS. 10A to 10C. In FIG. 10A, on a plane 1701 along which a curved surface 1700 is cut, part of a curve 1702, which is a form of the curved surface, is approximate to an arc of a circle, and the radius of the circle is referred to as a radius 1703 of curvature and the center of the circle is referred to as a center 1704 of curvature. FIG. 10B is a top view of the curved surface 1700. FIG. 10C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 11A:
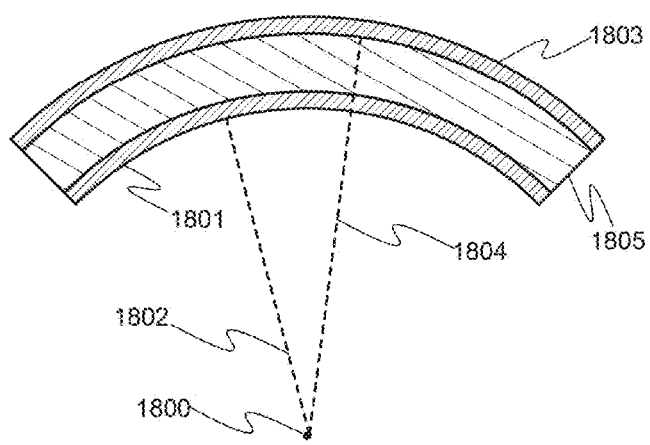
FIGS. 11A to 11D illustrate the radius of curvature of a film.
Figure 11B:
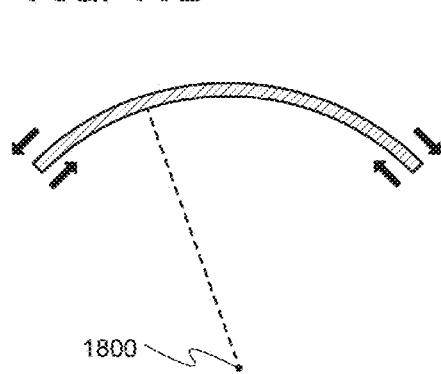

In the case of curving a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 11A). When the secondary battery is curved and has an arc-shaped cross section, compressive stress is applied to a surface of the film close to the center 1800 of curvature and tensile stress is applied to a surface of the film far from the center 1800 of curvature (FIG. 11B). However, by forming a pattern of projections and depressions on surfaces of the exterior bodies, influence of distortion can be reduced to be acceptable even when the compressive stress and the tensile stress are applied. For this reason, the secondary battery can change its form such that the exterior body on the side closer to the center of curvature has a curvature radius greater than or equal to 30 mm, preferably greater than or equal to 10 mm.

Figure 11C:
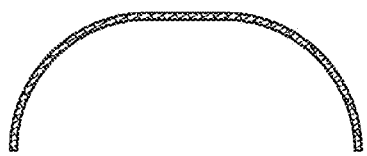
Figure 11D:

Note that the cross-sectional shape of the secondary battery is not limited to a simple arc shape, and the cross section can be partly arc-shaped; for example, a shape illustrated in FIG. 11C, a wavy shape illustrated in FIG. 11D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual current density is increased.

When the current density is extremely high, a voltage drop occurs depending on the resistance of the electrode, lithium is inserted into the active material and lithium is deposited on the surface of the active material. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

[Coin-Type Storage Battery]

Figure 12A:
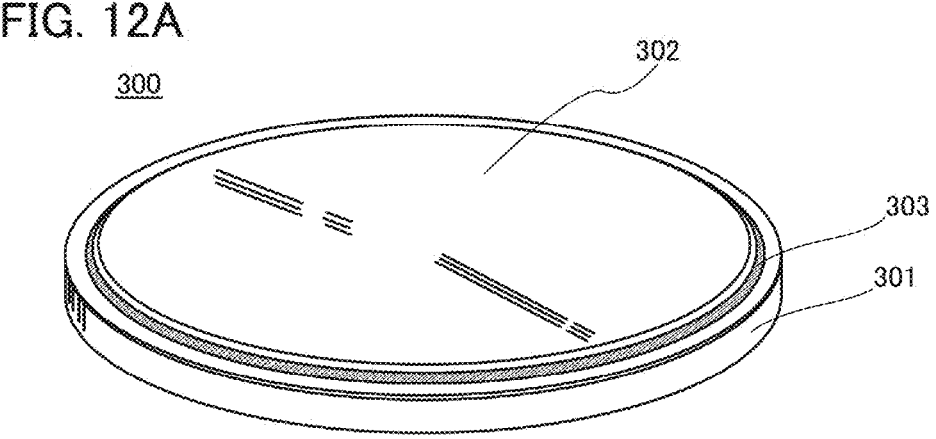
FIGS. 12A and 12B illustrate a coin-type storage battery.
Figure 12B:
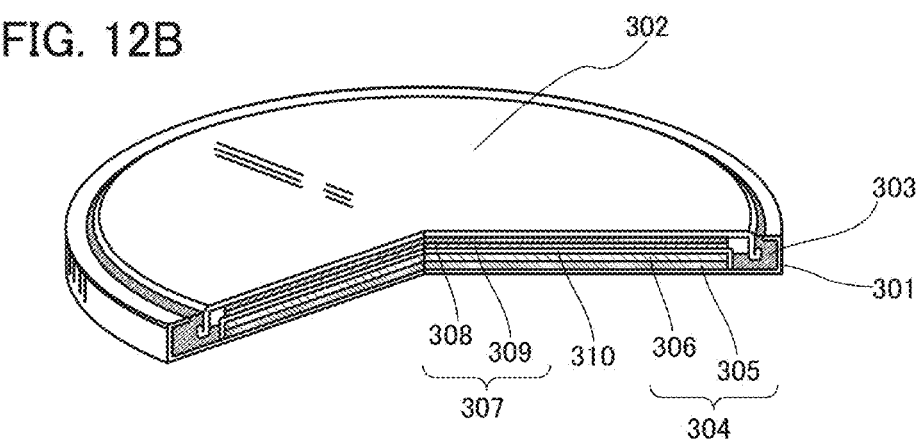

Next, an example of a coin-type storage battery will be described as an example of a power storage device with reference to FIGS. 12A and 12B. FIG. 12A is an external view of a coin-type (single-layer flat type) storage battery, and FIG. 12B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A negative electrode 307 includes a negative electrode current collector 308 and a negative electrode active material layer 309 provided in contact with the negative electrode current collector 308. The negative electrode active material layer 309 includes the negative electrode active material shown in Embodiment 1. For the negative electrode 307, the negative electrode shown in Embodiment 2 is preferably used.

A positive electrode 304 includes a positive electrode current collector 305 and a positive electrode active material layer 306 provided in contact with the positive electrode current collector 305. The description of the positive electrode active material layer 502 can be referred to for the positive electrode active material layer 306. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having corrosion resistance to an electrolytic solution, such as nickel, aluminum, or titanium, an alloy of such metals, or an alloy of such a metal and another metal (stainless steel or the like) can be used. Alternatively, it is preferable to cover the positive electrode can 301 and the negative electrode can 302 with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are soaked in the electrolytic solution. Then, as illustrated in FIG. 12B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 provided therebetween. In such a manner, the coin-type storage battery 300 can be fabricated.

[Cylindrical Storage Battery]

Figure 13A:
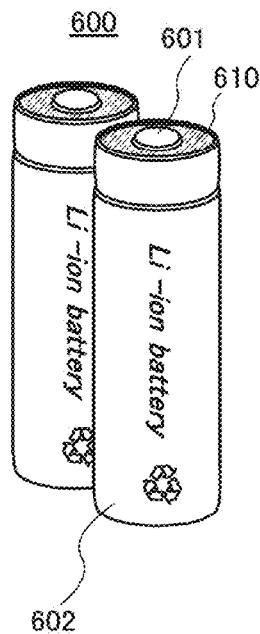
FIGS. 13A and 13B illustrate a cylindrical storage battery.

Next, an example of a cylindrical storage battery will be described as an example of a power storage device. The cylindrical storage battery will be described with reference to FIGS. 13A and 13B. As illustrated in FIG. 13A, a cylindrical storage battery 600 includes a positive electrode cap (battery cap) 601 on the top surface and a battery can (outer can) 602 on the side surface and bottom surface. The positive electrode cap 601 and the battery can (outer can) 602 are insulated from each other by a gasket (insulating gasket) 610.

Figure 13B:
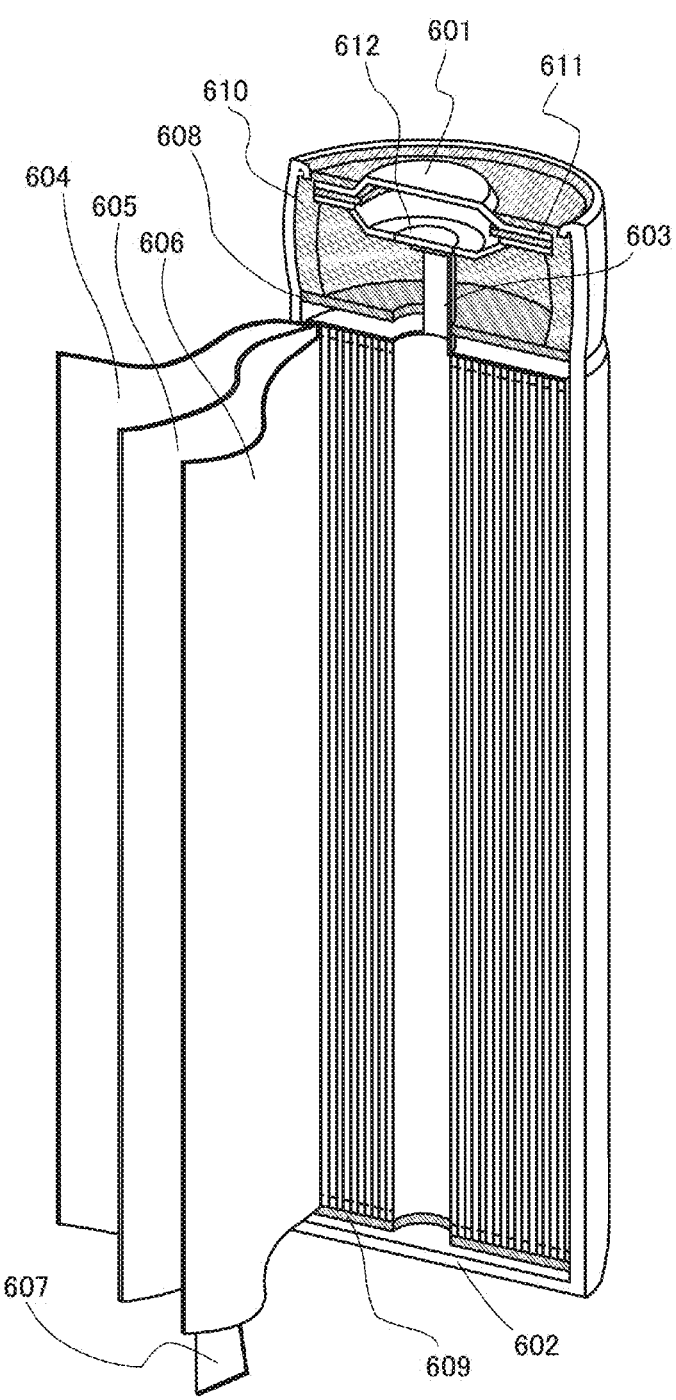

FIG. 13B is a schematic view of a cross-section of the cylindrical storage battery. Inside the battery can 602 having a hollow cylindrical shape, a battery element in which a strip-like positive electrode 604 and a strip-like negative electrode 606 are wound with a stripe-like separator 605 provided therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, it is preferable to cover the battery can with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to that of the above coin-type storage battery can be used.

For the negative electrode 606, the negative electrode shown in Embodiment 2 is preferably used. The positive electrode 604 can be formed in a way similar to that of forming the positive electrode 503 in the above-described thin storage battery. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type storage battery, the cylindrical storage battery, and the thin storage battery are given as examples of the storage battery; however, any of storage batteries with a variety of shapes, such as a sealed storage battery and a rectangular storage battery, can be used. Further, a structure in which a plurality of positive electrodes, a plurality of negative electrodes, and a plurality of separators are stacked or rolled may be employed. For example, FIGS. 14A to 14C, FIGS. 15A to 15C, FIGS. 16A and 16B, FIGS. 17A1 to 17B2, and FIGS. 18A and 18B illustrate examples of other storage batteries.

[Structural Example of Storage Battery]

FIGS. 14A to 14C and FIGS. 15A to 15C illustrate structural examples of thin storage batteries. A wound body 993 illustrated in FIG. 14A includes a negative electrode 994, a positive electrode 995, and a separator 996.

The wound body 993 is obtained by winding a sheet of stacks in each of which the negative electrode 994 overlaps with the positive electrode 995 with the separator 996 provided therebetween. The wound body 993 is covered with a rectangular sealed container or the like; thus, a rectangular secondary battery is fabricated.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 14A:
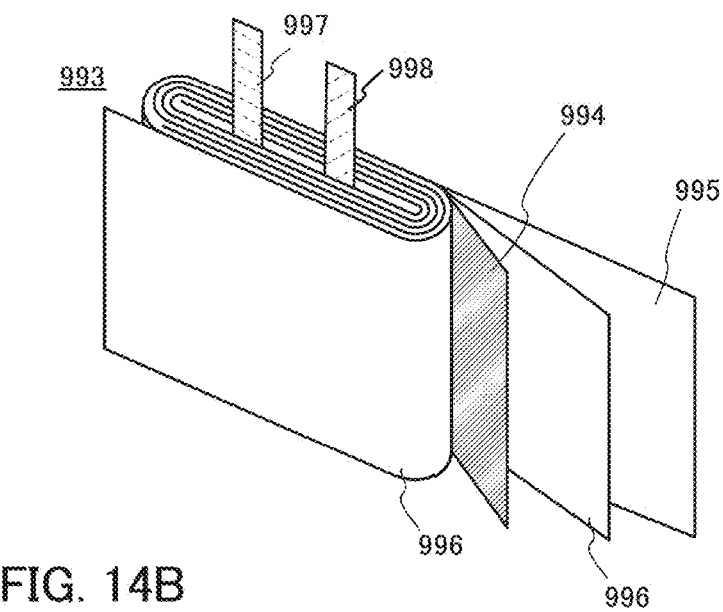
FIGS. 14A to 14C illustrate an example of a storage battery.
Figure 14B:
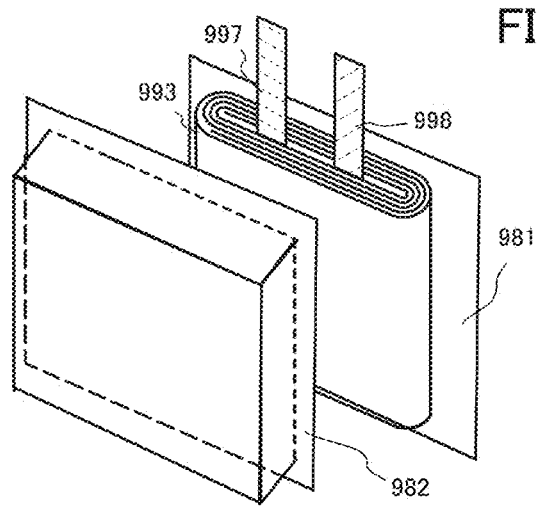
Figure 14C:
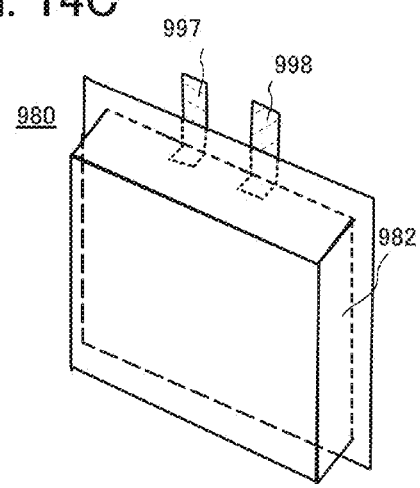

In a storage battery 980 illustrated in FIGS. 14B and 14C, the wound body 993 is packed in a space formed by bonding a film 981 and a film 982 having a depressed portion that serve as an exterior body by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 14B and 14C illustrate an example where a space is formed by two films, the wound body 993 may be placed in a space formed by bending one film.

Furthermore, a flexible power storage device can be fabricated when a resin material or the like is used for the exterior body and the sealed container of the power storage device. Note that in the case where a resin material is used for the exterior body and the sealed container, a conductive material is used for a portion connected to the outside.

For example, FIGS. 15A to 15C illustrate another example of a flexible thin storage battery. The wound body 993 illustrated in FIG. 15A is the same as that illustrated in FIG. 14A, and a detailed description thereof is omitted.

In a storage battery 990 illustrated in FIGS. 15B and 15C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

[Structural Example of Power Storage System]

Structural examples of power storage systems will be described with reference to FIGS. 16A and 16B, FIGS. 17A1 to 17B2, and FIGS. 18A and 18B. Here, a power storage system refers to, for example, a device including a power storage device.

Figure 16A:
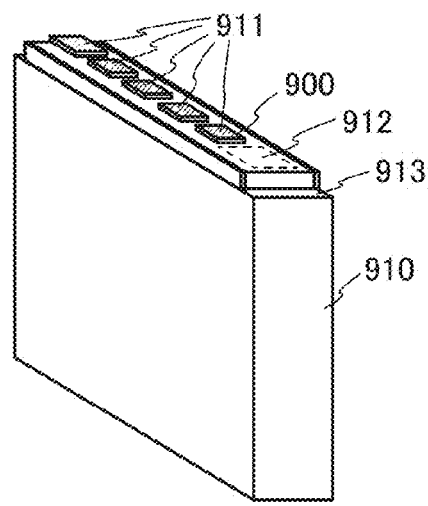
FIGS. 16A and 16B illustrate an example of a power storage system.
Figure 16B:
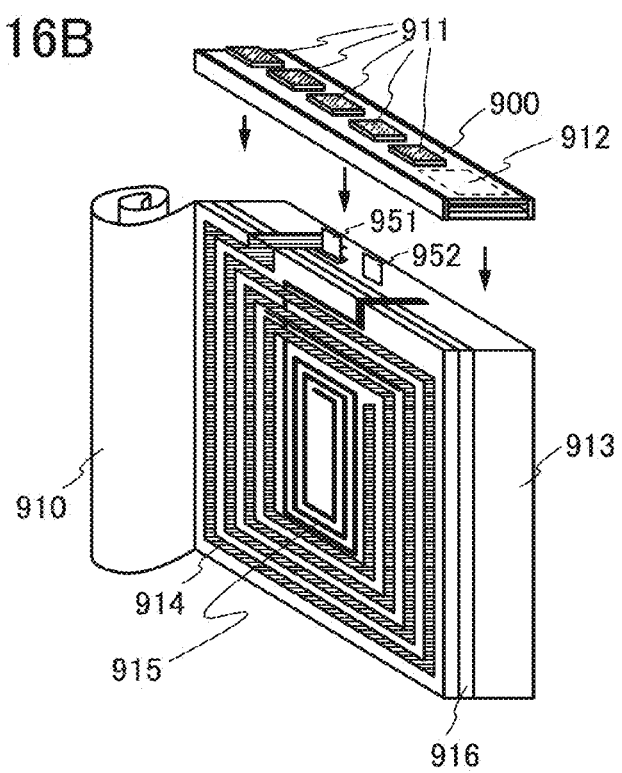

FIGS. 16A and 16B show external views of a power storage system. The power storage system includes a circuit board 900 and a storage battery 913. A label 910 is attached to the storage battery 913. As shown in FIG. 16B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear side of the circuit board 900. Each of the antennas 914 and 915 is not limited to having a coil shape and may have a linear shape or a plate shape. Further, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 has a function of blocking an electromagnetic field from the storage battery 913, for example. As the layer 916, for example, a magnetic body can be used.

Note that the structure of the power storage system is not limited to that shown in FIGS. 16A and 16B.

For example, as shown in FIGS. 17A1 and 17A2, two opposing surfaces of the storage battery 913 in FIGS. 16A and 16B may be provided with respective antennas. FIG. 17A1 is an external view illustrating one of the opposing surfaces, and FIG. 17A2 is an external view illustrating the other of the opposing surfaces. Note that for the same portions as the power storage system in FIGS. 16A and 16B, description on the power storage system in FIGS. 16A and 16B can be referred to as appropriate.

As illustrated in FIG. 17A1, the antenna 914 is provided on one of the opposing surfaces of the storage battery 913 with the layer 916 provided therebetween, and as illustrated in FIG. 17A2, an antenna 915 is provided on the other of the opposing surfaces of the storage battery 913 with the layer 917 provided therebetween. The layer 917 has a function of blocking an electromagnetic field from the storage battery 913, for example. As the layer 917, for example, a magnetic body can be used.

With the above structure, both of the antennas 914 and 915 can be increased in size.

Alternatively, as illustrated in FIGS. 17B1 and 17B2, two opposing surfaces of the storage battery 913 in FIGS. 16A and 16B may be provided with different types of antennas. FIG. 17B1 is an external view showing one of the opposing surfaces, and FIG. 17B2 is an external view showing the other of the opposing surfaces. Note that for the same portions as the power storage system in FIGS. 16A and 16B, description on the power storage system in FIGS. 16A and 16B can be referred to as appropriate.

As illustrated in FIG. 17B1, the antenna 914 and the antenna 915 are provided on one of the opposing surfaces of the storage battery 913 with the layer 916 provided therebetween, and as illustrated in FIG. 17B2, an antenna 918 is provided on the other of the opposing surfaces of the storage battery 913 with a layer 917 provided therebetween. The antenna 918 has a function of performing data communication with an external device, for example. An antenna with a shape that can be used for the antennas 914 and 915, for example, can be used as the antenna 918. As an example of a method for communication between the power storage system and another device via the antenna 918, a response method that can be used between the power storage system and another device, such as NFC, can be employed.

Figure 18A:
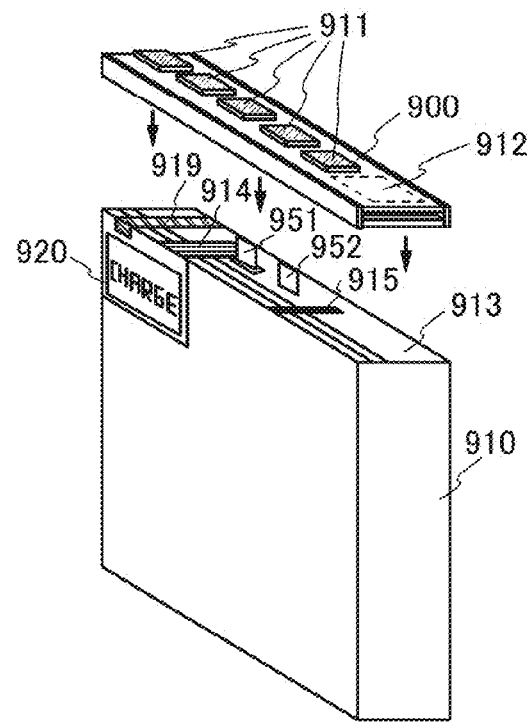
FIGS. 18A and 18B illustrate an example of a power storage system.

Alternatively, as illustrated in FIG. 18A, the storage battery 913 in FIGS. 16A and 16B may be provided with a display device 920. The display device 920 is electrically connected to the terminal 911 via a terminal 919. It is possible that the label 910 is not provided in a portion where the display device 920 is provided. Note that for the same portions as the power storage system in FIGS. 16A and 16B, description on the power storage system in FIGS. 16A and 16B can be referred to as appropriate.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, power consumption of the display device 920 can be reduced when electronic paper is used.

Figure 18B:
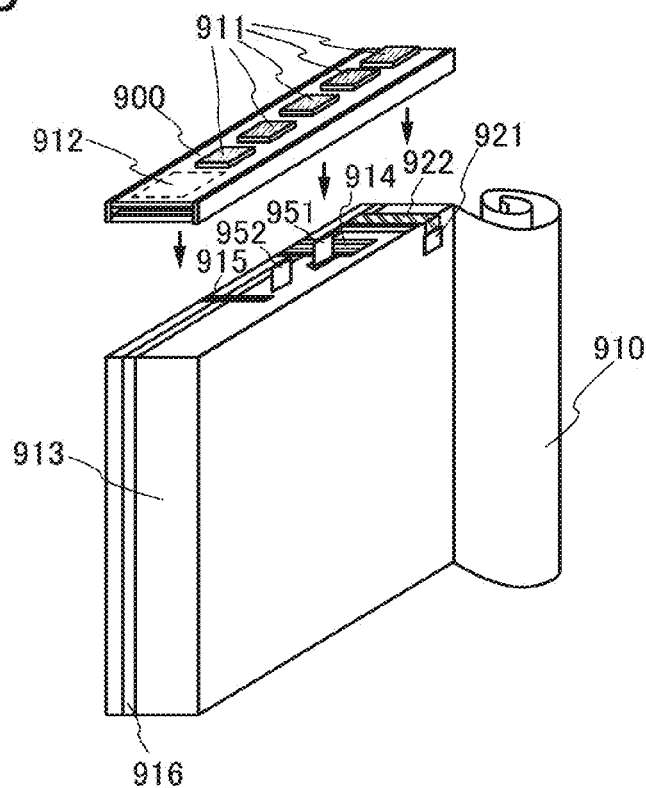

Alternatively, as illustrated in FIG. 18B, the storage battery 913 illustrated in FIGS. 16A and 16B may be provided with a sensor 921. The sensor 921 is electrically connected to the terminal 911 via a terminal 922. Note that for the same portions as the power storage system in FIGS. 16A and 16B, description on the power storage system in FIGS. 16A and 16B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on the environment (e.g., temperature) where the power storage system is placed can be acquired and stored in a memory in the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 4

In this embodiment, an example of an electronic device including a flexible storage battery will be described.

FIGS. 19A to 19G illustrate examples of electronic devices including the flexible storage batteries described in Embodiment 2. Examples of an electronic device including a flexible power storage device include television devices (also referred to as televisions or television receivers), monitors of computers or the like, cameras such as digital cameras or digital video cameras, digital photo frames, mobile phones (also referred to as cellular phones or mobile phone devices), portable game machines, portable information terminals, audio reproducing devices, large game machines such as pachinko machines, and the like.

In addition, a flexible power storage device can be incorporated along a curved inside/outside wall surface of a house or a building or a curved interior/exterior surface of a car.

Figure 19A:
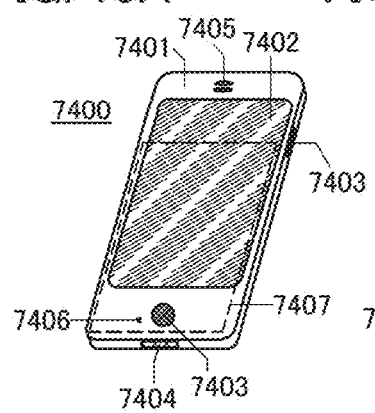
FIGS. 19A to 19G illustrate examples of electronic devices.

FIG. 19A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 19B:
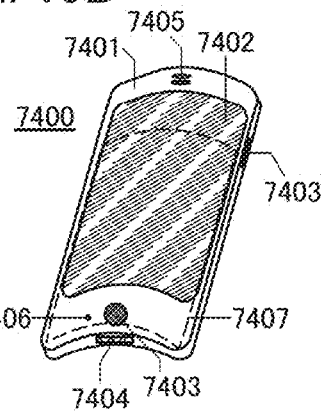
Figure 19C:
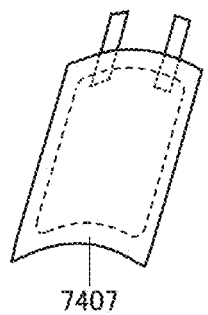

The mobile phone 7400 illustrated in FIG. 19B is bent. When the whole mobile phone 7400 is bent by the external force, the power storage device 7407 included in the mobile phone 7400 is also bent. FIG. 19C illustrates the bent power storage device 7407. The power storage device 7407 is a thin storage battery. The power storage device 7407 is fixed in a state of being bent. Note that the power storage device 7407 includes a lead electrode electrically connected to a current collector. The current collector is, for example, copper foil, and partly alloyed with gallium; thus, adhesion between the current collector and an active material layer in contact with the current collector is improved and the power storage device 7407 can have high reliability even in a state of being bent.

Figure 19D:
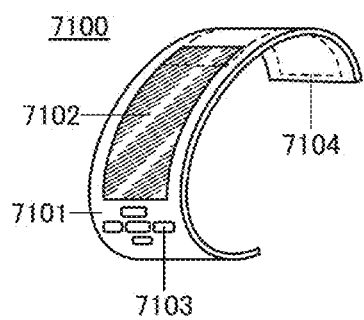
Figure 19E:

FIG. 19D illustrates an example of a bangle-type display device. A portable display device 7100 includes a housing 7101, a display portion 7102, an operation button 7103, and a power storage device 7104. FIG. 19E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 19F:
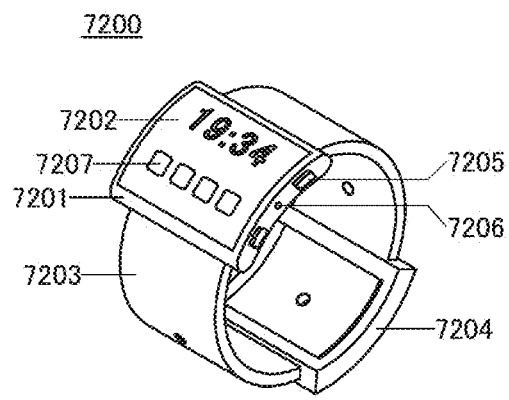

FIG. 19F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is bent, and images can be displayed on the bent display surface. Further, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power ON/OFF, ON/OFF of wireless communication, setting and cancellation of manner mode, and setting and cancellation of power saving mode can be performed. For example, the functions of the operation button 7205 can be set freely by the operating system incorporated in the portable information terminal 7200.

Further, the portable information terminal 7200 can perform near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. Power charging through the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 19E that is in the state of being curved can be provided in the housing 7201. Alternatively, the power storage device 7104 illustrated in FIG. 19E can be provided in the band 7203 such that it can be curved.

Figure 19G:
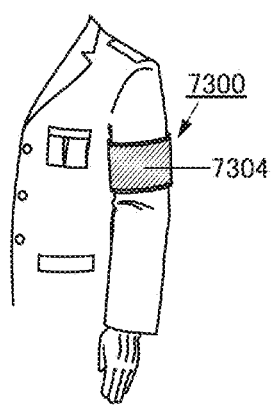

FIG. 19G illustrates an example of an armband-type display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication that is a communication method based on an existing communication standard.

The display device 7300 includes an input output terminal, and data can be directly transmitted to and received from another information terminal via a connector. Power charging through the input output terminal is possible. Note that the charging operation may be performed by wireless power feeding without using the input output terminal.

This embodiment can be implemented in appropriate combination with any of the other embodiments.

Embodiment 5

In this embodiment, examples of electronic devices that can include power storage devices will be described.

Figure 20A:
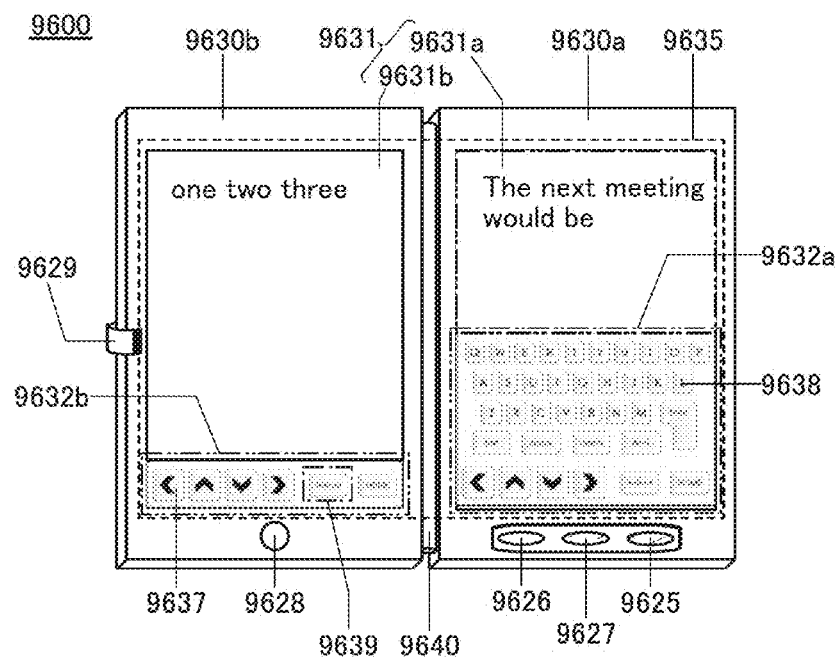
FIGS. 20A to 20C illustrate an example of an electronic device.
Figure 20B:
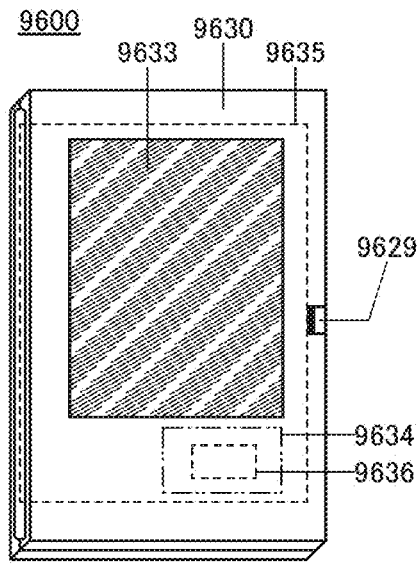

FIGS. 20A and 20B illustrate an example of a tablet terminal that can be folded in half. A tablet terminal 9600 illustrated in FIGS. 20A and 20B includes a housing 9630*a*, a housing 9630*b*, a movable portion 9640 connecting the housings 9630*a* and 9630*b*, a display portion 9631 provided with a display portion 9631*a* and a display portion 9631*b*, a display mode switch 9626, a power switch 9627, a power saver switch 9625, a fastener 9629, and an operation switch 9628. FIGS. 20A and 20B illustrate the tablet terminal 9600 opened and closed, respectively.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that, as an example, half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display keyboard buttons and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The switch 9626 for switching a display mode allows switching between a landscape mode and a portrait mode, color display and black-and-white display, and the like. The power saver switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same display size in FIG. 20A, one embodiment of the present invention is not limited to this example. The display portion 9631a and the display portion 9631b may have different sizes or different display quality. For example, one of the display portions may display higher definition images than the other.

The tablet terminal is closed in FIG. 20B. The tablet terminal includes the housing 9630, a solar cell 9633, and a charge and discharge control circuit 9634 including a DC-DC converter 9636. The power storage unit of one embodiment of the present invention is used as the power storage unit 9635.

The tablet terminal 9600 can be folded in two so that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a large decrease in charge and discharge capacity. Thus, a highly reliable tablet terminal can be provided.

The tablet terminal illustrated in FIGS. 20A and 20B can also have a function of displaying various kinds of data, such as a calendar, a date, or the time, on the display portion as a still image, a moving image, and a text image, a function of displaying, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged. The use of a lithium-ion battery as the power storage unit 9635 brings an advantage such as a reduction in size.

Figure 20C:
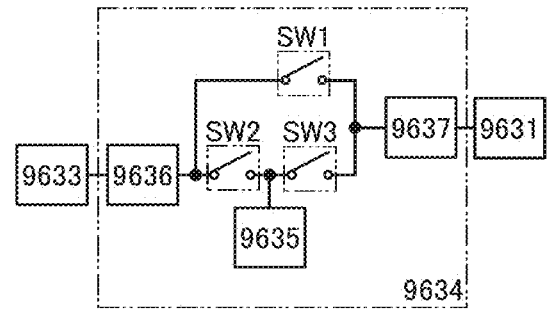

The structure and the operation of the charge and discharge control circuit 9634 illustrated in FIG. 20B will be described with reference to a block diagram in FIG. 20C. The solar cell 9633, the power storage unit 9635, the DC-DC converter 9636, a converter 9637, switches SW1 to SW3, and the display portion 9631 are illustrated in FIG. 20C, and the power storage unit 9635, the DC-DC converter 9636, the converter 9637, and the switches SW1 to SW3 correspond to the charge and discharge control circuit 9634 in FIG. 20B.

First, an example of operation in the case where power is generated by the solar cell 9633 using external light is described. The voltage of electric power generated by the solar cell is raised or lowered by the DC-DC converter 9636 to a voltage for charging the power storage unit 9635. When the display portion 9631 is operated with the power from the solar cell 9633, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit may be charged with a non-contact power transmission module capable of performing charging by transmitting and receiving electric power wirelessly (without contact), or any of the other charge means used in combination.

Figure 21:
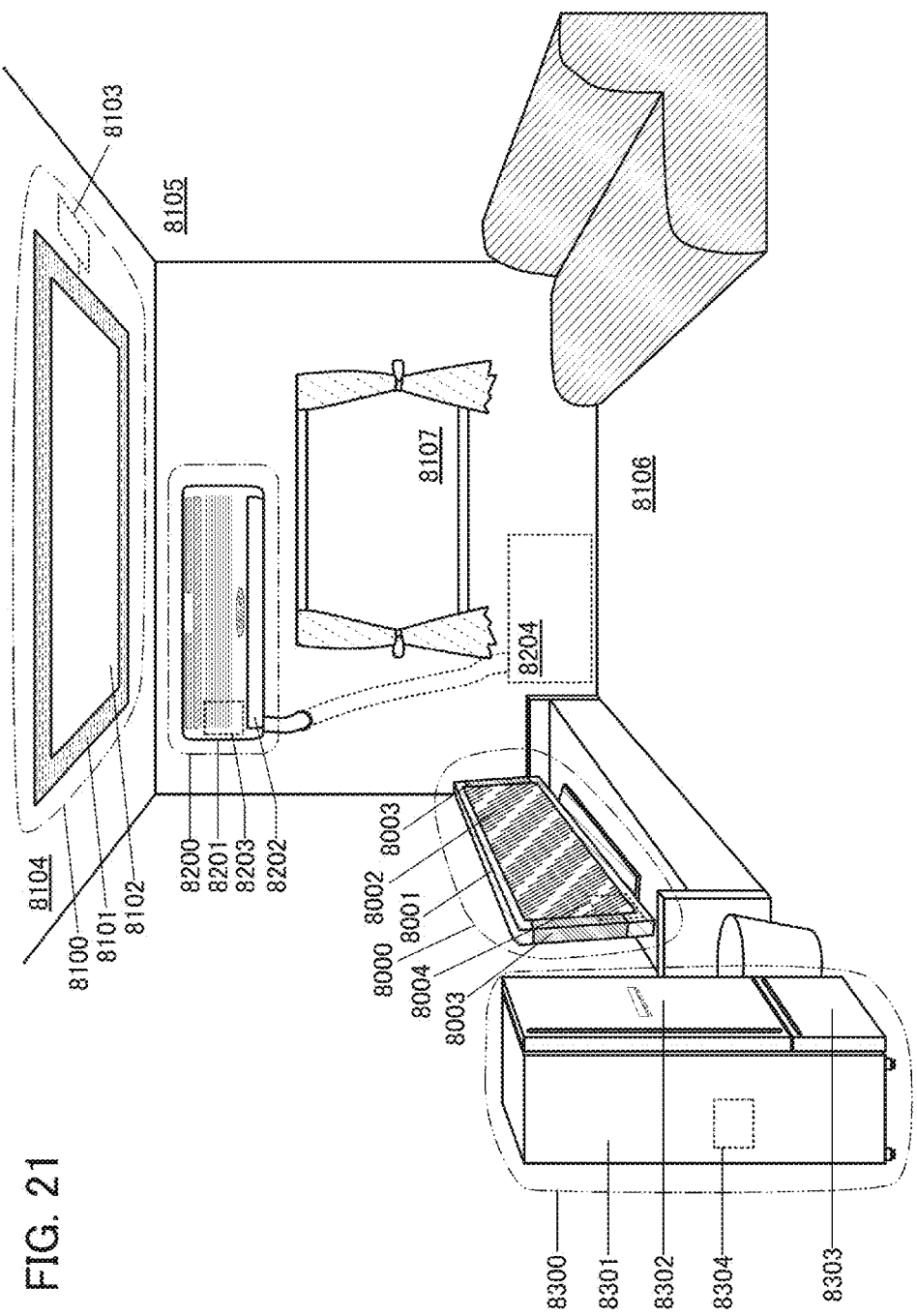
FIG. 21 illustrates examples of electronic devices.

FIG. 21 illustrates examples of other electronic devices. In FIG. 21, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device is any of all of information display devices for personal computers, advertisement displays, and the like besides TV broadcast reception.

In FIG. 21, an installation lighting device 8100 is an example of an electronic device including a power storage device 8103 of one embodiment of the present invention. Specifically, the lighting device 8100 includes a housing 8101, a light source 8102, and a power storage device 8103. Although FIG. 21 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 21 as an example, the power storage device of one embodiment of the present invention can be used in an installation lighting device provided in, for example, a wall 8105, a floor 8106, a window 8107, or the like other than the ceiling 8104. Alternatively, the power storage device can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 21, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 21 illustrates the case where the power storage device 8203 is provided in the indoor unit 8200, the power storage device 8203 may be provided in the outdoor unit 8204. Alternatively, the power storage device 8203 may be provided in both the indoor unit 8200 and the outdoor unit 8204. The air conditioner can receive electric power from the commercial power source. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power source even when electric power cannot be supplied from a commercial power source due to power failure or the like.

Note that although the separated air conditioner including the indoor unit and the outdoor unit is shown in FIG. 21 as an example, the power storage device of one embodiment of the present invention can be used in an air conditioner in which the functions of an indoor unit and an outdoor unit are integrated in one housing.

In FIG. 21, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 21. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. Then, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in appropriate combination with any of the other embodiments.

Embodiment 6

In this embodiment, examples of vehicles using power storage devices will be described.

The use of a power storage device in vehicles can lead to next-generation clean energy vehicles such as hybrid electric vehicles (HEVs), electric vehicles (EVs), and plug-in hybrid electric vehicles (PHEVs).

Figure 22A:
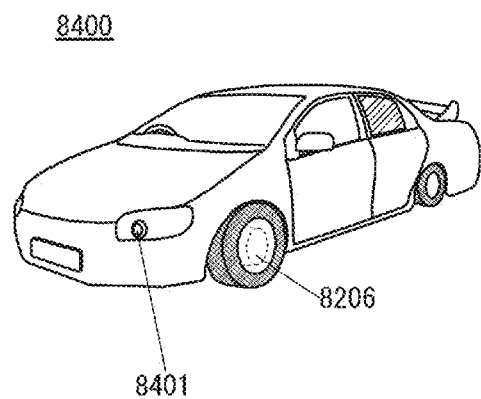
FIGS. 22A and 22B illustrate examples of vehicles.
Figure 22B:
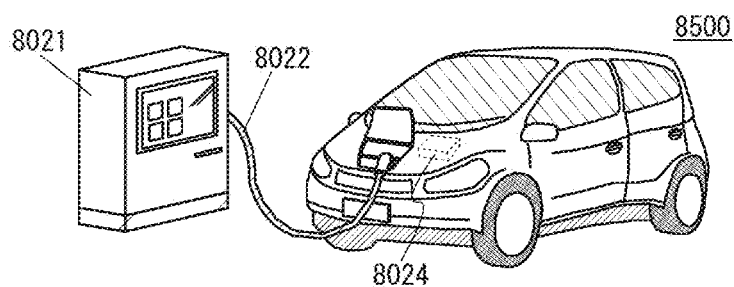

FIGS. 22A and 22B each illustrate an example of a vehicle using one embodiment of the present invention. An automobile 8400 illustrated in FIG. 22A is an electric vehicle which runs on the power of the electric motor. Alternatively, the automobile is a hybrid electric vehicle capable of driving using either the electric motor or the engine as appropriate. One embodiment of the present invention achieves a high-mileage vehicle. The automobile 8400 includes a power storage device. The power storage device is used not only for driving the electric motor 8206, but also for supplying electric power to a light-emitting device such as a headlight 8401 or a room light (not illustrated).

The power storage device can also supply electric power to a display device included in the automobile 8400, such as a speedometer or a tachometer. Furthermore, the power storage device can supply electric power to a semiconductor device included in the automobile 8400, such as a navigation system.

FIG. 22B illustrates an automobile 8500 including a power storage device. The automobile 8500 can be charged when the power storage device is supplied with electric power through external charging equipment by a plug-in system, a contactless power feeding system, or the like. In FIG. 22B, the power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, a power storage device 8024 included in the automobile 8500 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Further, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, a forming method and measurement results of the negative electrode active material of one embodiment of the present invention are described.

[Formation of Negative Electrode Active Material]

First, samples 111 to 113 that are to be the negative electrode active materials were formed. As a raw material, silicon monoxide (SiO) powder was used.

The silicon monoxide powder was baked in a baking furnace. The baking was performed under conditions shown in Table 1. Table 1 shows the temperature rising rate from a room temperature to a target temperature and the treatment time at the target temperature. For example, the treatment was performed on the sample 111 during a period when the temperature was raised from a room temperature to 1,000° C. at a temperature rising rate of 240° C./hour and then maintained at 1,000° C. for 3 hours. The baking is performed in a nitrogen atmosphere.

TABLE 1

| | Temperature rising rate | Target temperature | Treatment time |
|---|---|---|---|
| Sample 111 | 240° C./hr. | 1000° C. | 3 hr. |
| Sample 112 | 240° C./hr. | 1100° C. | 3 hr. |
| Sample 113 | 240° C./hr. | 1200° C. | 3 hr. |

After the baking, crushing was performed with a mortar.

[XRD Observation]

Figure 24A:
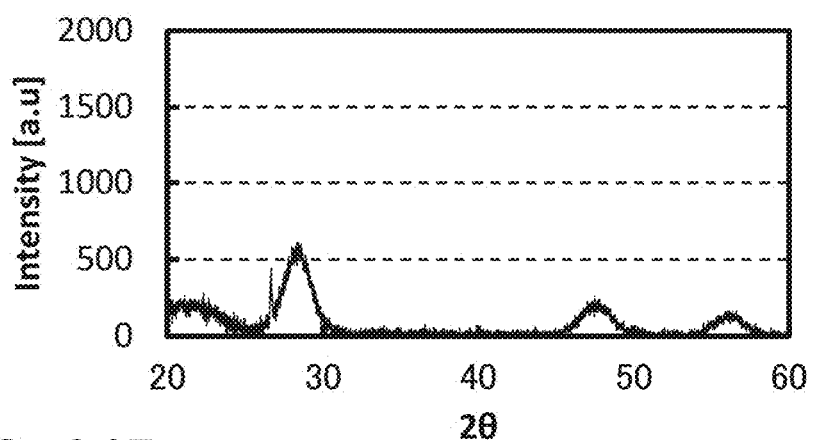
FIGS. 24A to 24C show results of X-ray diffraction measurement.
Figure 24B:
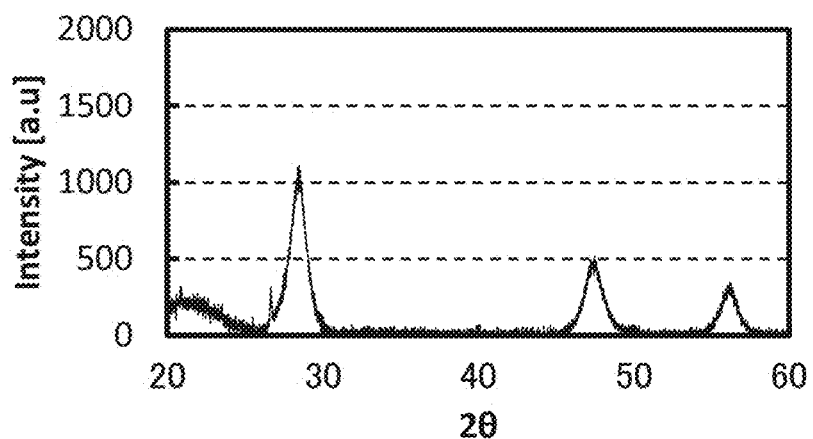
Figure 24C:
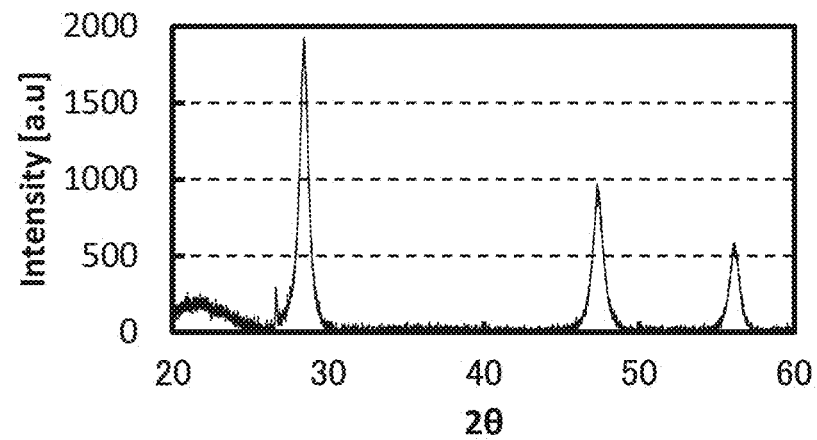

The samples 111 to 113 subjected to the baking were observed with X-ray diffraction (XRD). The results of XRD are shown in FIGS. 24A to 24C. FIGS. 24A, 24B, and 24C show the results of the sample 111, the sample 112, and the sample 113, respectively. Here, a peak at around 2θ=28°, a peak at around 2θ=47°, and a peak at around 2θ=56° correspond to a (111) plane, a (220) plane, and a (311) plane, respectively.

The crystallite size of silicon was calculated from analysis of the obtained XRD results. The crystallite size was calculated by Rietveld analysis. As analysis software, TOPAS (DIFFRAC$^{plus}$ TOPAS Version 3) manufactured by Bruker AXS was used. The structure of the space group F-43m was used for Rietveld analysis, and fitting was performed, so that the lattice constant and the crystallite size were calculated. The obtained crystallite sizes of the samples 111, 112, and 113 were 3.2 nm, 6.7 nm, and 12 nm, respectively. The obtained lattice constants of the samples 111, 112, and 113 were 0.53687 nm, 0.54175 nm, and 0.54279 nm, respectively.

[Cross-Sectional TEM Observation]

Next, the obtained samples 111 to 113 were observed with scanning transmission electron microscopy (STEM) and transmission electron microscopy (TEM). As an STEM apparatus, HD-2300 manufactured by Hitachi High-Technologies Corporation was used. As a TEM apparatus, H-9500 manufactured by Hitachi High-Technologies Corporation was used. The accelerating voltage was 300 kV. FIGS. 25A to 25C, FIG. 26A, FIGS. 27A and 27B, FIG. 28A, FIGS. 29A and 29B, and FIG. 30A show results of the observation.

Figure 25A:
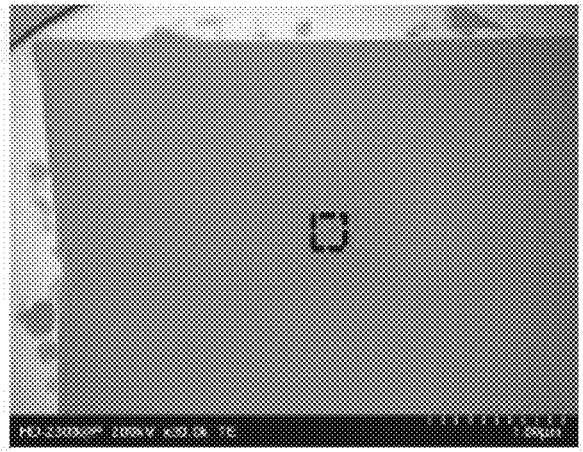
FIGS. 25A to 25C show cross-sectional STEM images and a cross-sectional TEM image.
Figure 25B:
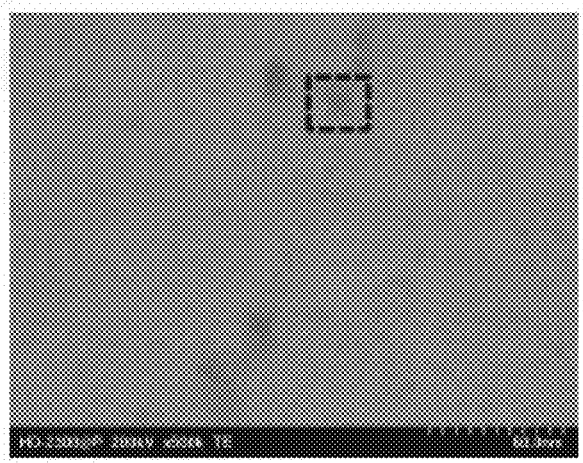
Figure 25C:
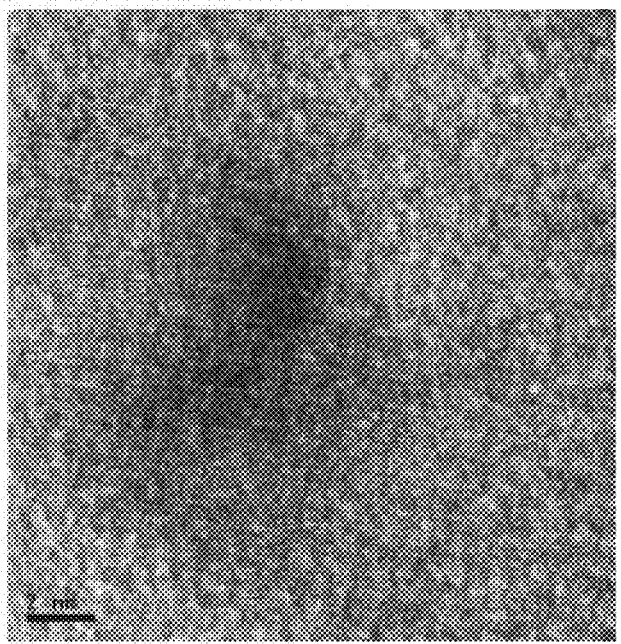
Figure 26A:
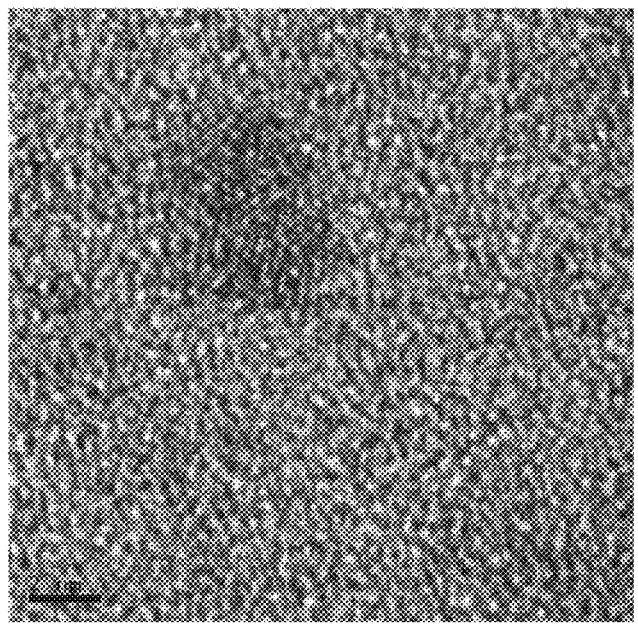
FIGS. 26A and 26B show a cross-sectional TEM image and a selected area diffraction pattern.

FIGS. 25A to 25C show observation results of the sample 111. FIG. 25A shows the observation result with STEM at a magnification of 30,000 times, and FIG. 25B shows the observation result, with STEM at a magnification of 500,000 times, of a region enclosed by a dashed line in FIG. 25A. FIG. 25C shows the observation result, with TEM at a magnification of 8,000,000 times, of a region enclosed by a dashed line in FIG. 25B. FIG. 26A shows the observation result, with TEM at a magnification of 8,000,000 times, of a region different from that shown in FIGS. 25A to 25C. A darker portion than others in FIG. 25C or FIG. 26A is estimated to have a crystal of silicon. In FIG. 26A, a lattice image is clearly observed in a darker portion.

Figure 26B:
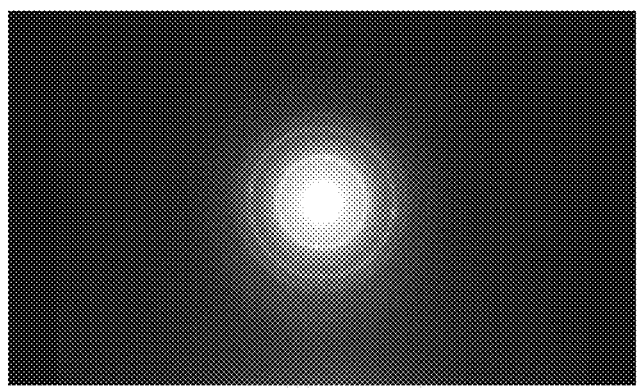

FIG. 26B shows a selected area diffraction pattern of the sample 111. As shown in FIG. 26B, three rings are observed. Analysis with the use of a camera constant suggested that the three rings corresponded to a (111) plane, a (220) plane, and a (311) plane of silicon in order from the inside.

Figure 27A:
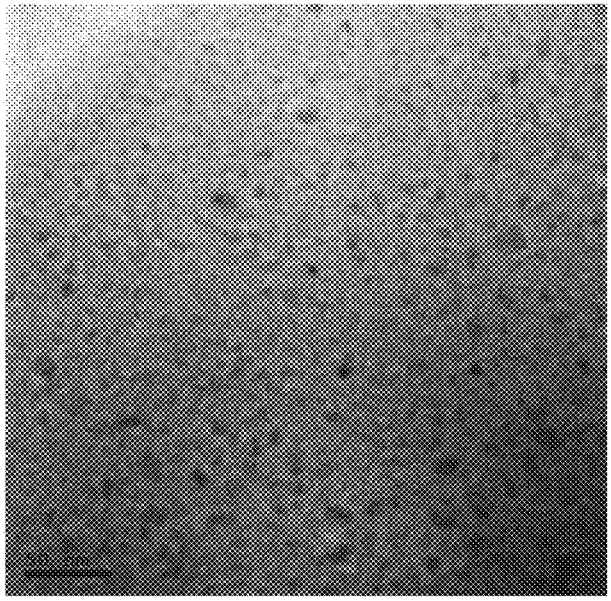
FIGS. 27A and 27B show cross-sectional TEM images.
Figure 27B:
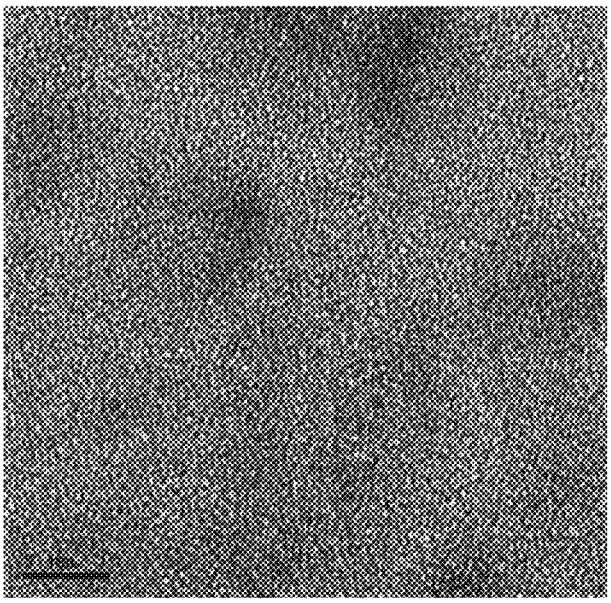
Figure 28A:
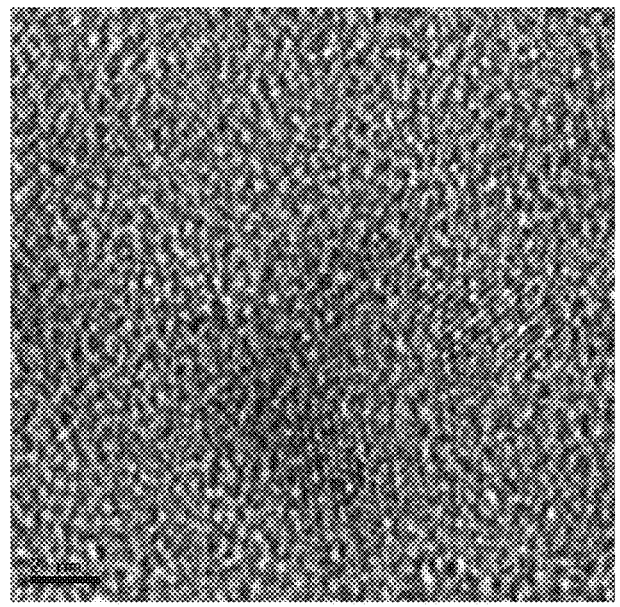
FIGS. 28A and 28B show a cross-sectional TEM image and a selected area diffraction pattern.
Figure 28B:
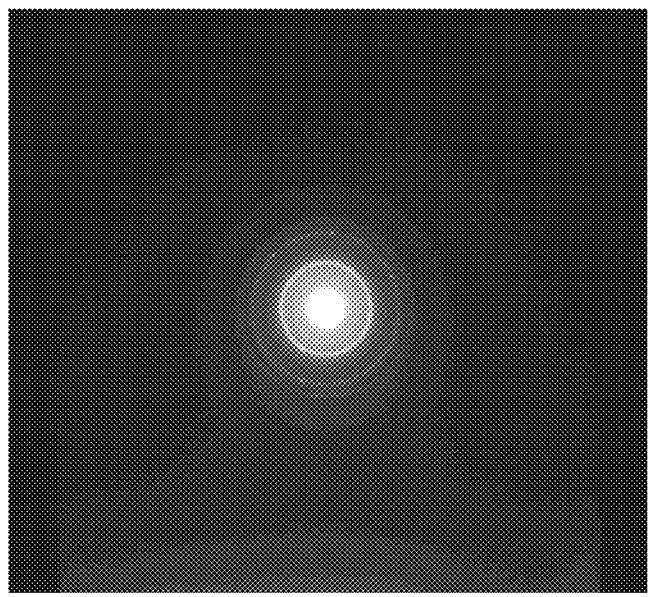

FIGS. 27A and 27B and FIG. 28A show observation results of the sample 112. FIG. 27A shows the observation result with TEM at a magnification of 400,000 times, FIG. 27B shows the observation result at a magnification of 4,000,000 times, and FIG. 28A shows the observation result at a magnification of 8,000,000 times. In FIG. 28A, a lattice image is clearly observed. FIG. 28B shows a selected area diffraction pattern of the sample 112. As in FIG. 26B, three rings are observed.

Figure 29A:
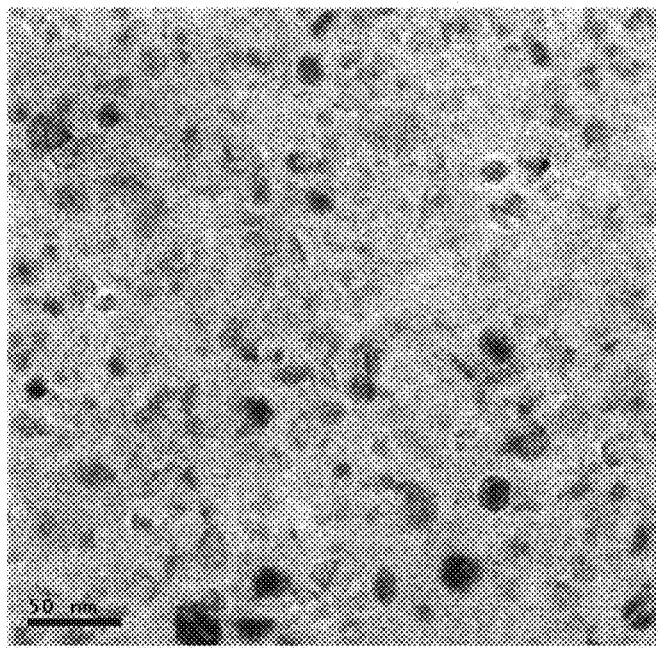
FIGS. 29A and 29B show cross-sectional TEM images.
Figure 29B:
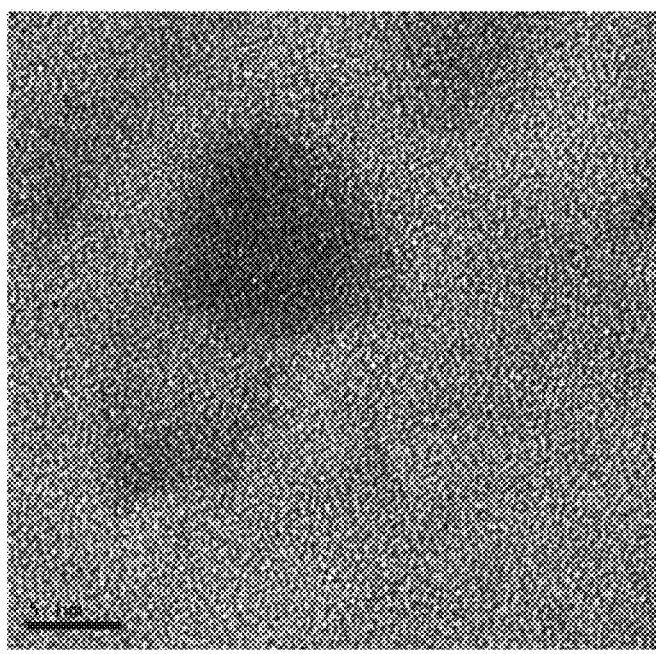
Figure 30A:
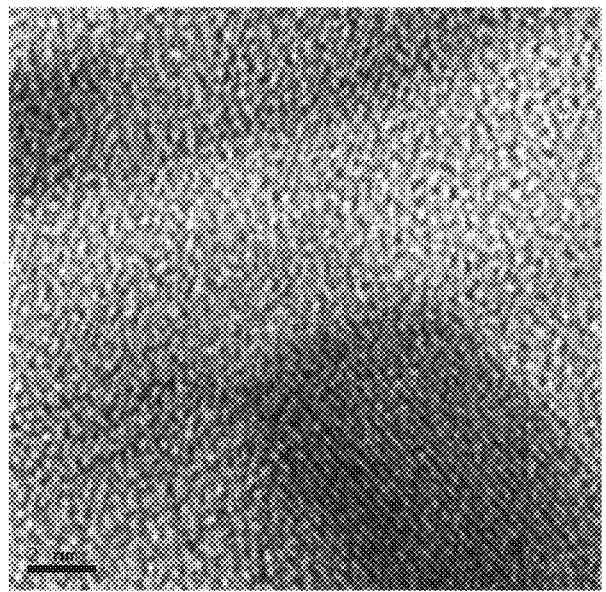
FIGS. 30A and 30B show a cross-sectional TEM image and a selected area diffraction pattern.
Figure 30B:
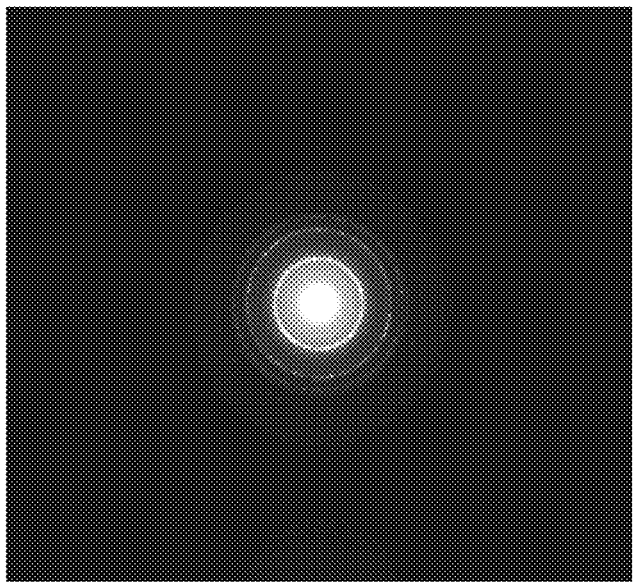

FIGS. 29A and 29B and FIG. 30A show observation results of the sample 113. FIG. 29A shows the observation result with TEM at a magnification of 400,000 times, FIG. 29B shows the observation result at a magnification of 4,000,000 times, and FIG. 30A shows the observation result at a magnification of 8,000,000 times. In FIG. 30A, a lattice image is clearly observed. As compared with the sample 112, it is suggested that the sample 113 has a large crystal region. FIG. 30B shows a selected area diffraction pattern of the sample 113. In FIG. 30B, spots are arranged in a ring pattern. The observation of the samples 111 to 113 with selected area diffraction was performed on a region with approximately 300 nmϕ.

[Measurement of Particle Size]

Particle sizes were measured using a laser diffraction particle size analyzer (SALD-2200 manufactured by Shimadzu Corporation). A laser diffraction and scattering method was used as a method for calculating the particle size. Table 2 shows the average particle sizes and the values of D90 (the particle size when the integrated amount of particle size distribution in the accumulated particle curve obtained as a result of particle size measurement is 90%).

TABLE 2

|  | Average particle size [μm] | Standard deviation [μm] | D90 [μm] |
|---|---|---|---|
| Sample 111 | 3.41 | 0.476 | 17.39 |
| Sample 112 | 3.78 | 0.476 | 14.81 |
| Sample 113 | 3.84 | 0.497 | 15.85 |

As shown in Table 2, the obtained average particle sizes of the sample 111, the sample 112, and the sample 113 were 3.41 μm, 3.78 μm, and 3.84 μm, respectively.

Example 2

In this embodiment, measurement results of a power storage device formed using the negative electrode active material shown in Example 1 are described.

[Formation of Electrode]

An electrode was formed using the negative electrode active material obtained in Example 1. Acetylene black (AB) was used as a conductive additive, and a precursor of polyimide was used as a binder. Composition of the electrode was adjusted so that the proportion of the sample 111 to AB to the precursor of polyimide was 80:5:15 (weight %).

Figure 31:
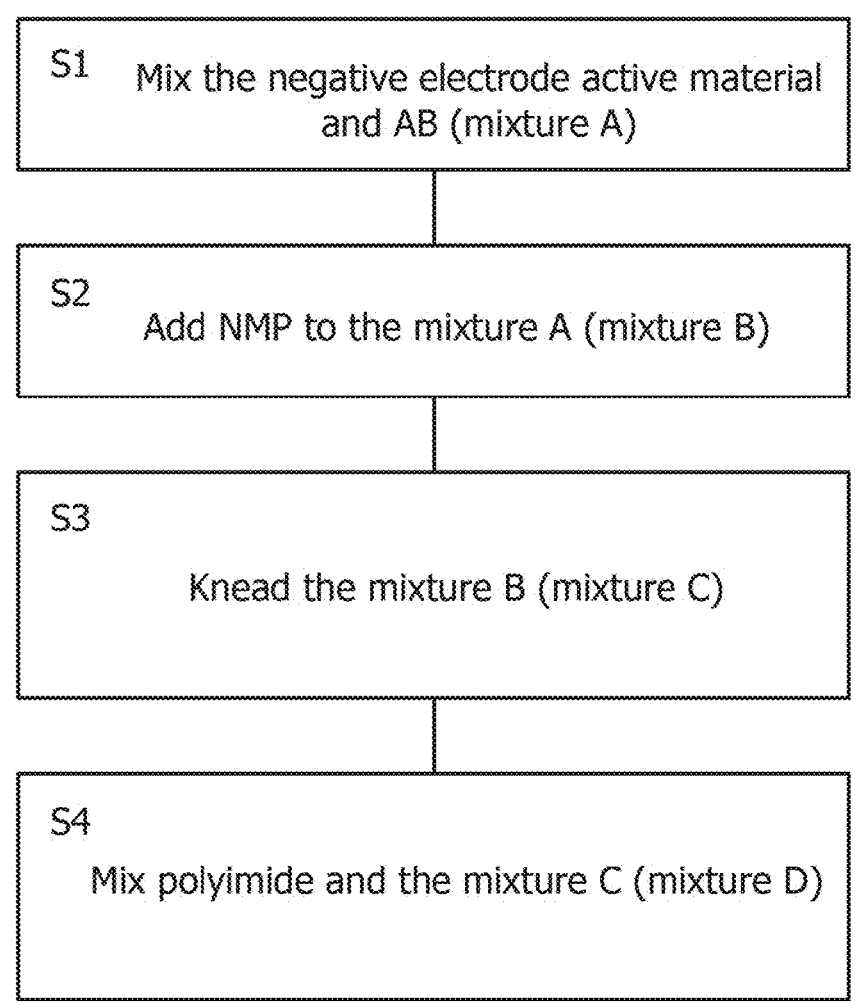
FIG. 31 illustrates a method for forming an electrode.

Next, methods for forming the electrodes will be described. FIG. 31 shows a flow of the formation method. The negative electrode active material and AB were weighed and mixed to obtain a mixture A (Step S1). Next, the mixture A was stirred with a mixer (a planetary centrifugal mixer "THINKY MIXER" manufactured by THINKY CORPORATION) and NMP was added thereto as a solvent in several parts to obtain a mixture B (Step S2). Here, when the amount of added NMP is reduced and adjusted so that the viscosity of the mixture B is high, mixing (kneading) with a mixer later can be performed on the mixture with high viscosity. The kneading can weaken cohesion of the active material, and increase dispersibility of the active material and AB.

Next, the mixture B was kneaded with a mixer. Five-minute treatment at 2000 rpm was performed 5 times to obtain a mixture C (Step S3).

Next, the precursor of polyimide was added, and mixing with a mixer was performed. Five-minute treatment at 2000 rpm was performed three times to obtain a mixture D (Step S4). The proportion of the solid content of the mixture D was 67%. The proportion of the solid content means the proportion of the weight of materials other than the solvent (the weight sum of the active material, AB, and the precursor of polyimide) to the total weight of the mixture D. Note that 13.7% of the used precursor of polyimide was imidized to be polyimide through heat treatment.

Next, a copper current collector (with a thickness of 18 μm) provided with graphite as an undercoat was prepared. Next, the obtained mixture D was applied to a surface of the current collector provided with the undercoat. A blade method was used for the application. The distance between the blade and the current collector was set to 100 μm.

After that, treatment for volatilizing the solvent was performed for 2 hours at 80° C. in a reduced-pressure atmosphere with a vacuum dryer, and then heat treatment was performed for 5 hours at 200° C. in a reduced-pressure atmosphere with a small vacuum-atmosphere furnace HV-13C manufactured by MOTOYAMA. Through the above steps, the electrode including the negative electrode active material was formed.

The electrodes including the sample 111, the sample 112, and the sample 113 as their negative electrode active materials are referred to as an electrode 111, an electrode 112, and an electrode 113, respectively.

[Fabrication of Storage Batteries]

Next, as a counter electrode, lithium metal was combined with each of the electrodes 111 to 113 to form a half cell. Plural regions were stamped out from the electrodes, and two or three half cells were formed. The thickness and the amount of the active material in each of the electrodes used for the half cells are shown in Table 3.

TABLE 3

| | Electrode | | |
|---|---|---|---|
| | Type | Amount of active material [mg/cm$^2$] | Thickness of electrode [μm] |
| Storage battery 111-1 | Electrode 111 | 2.0 | 33 |
| Storage battery 111-2 | Electrode 111 | 2.0 | 36 |
| Storage battery 111-3 | Electrode 111 | 2.0 | 42 |
| Storage battery 112-1 | Electrode 112 | 2.1 | 33 |
| Storage battery 112-2 | Electrode 112 | 2.0 | 37 |
| Storage battery 113-1 | Electrode 113 | 1.9 | 49 |
| Storage battery 113-2 | Electrode 113 | 1.9 | 47 |
| Storage battery 113-3 | Electrode 113 | 1.9 | 48 |

As shown in Table 3, storage batteries 111-1 to 111-3 were formed using the electrode 111. Similarly, storage batteries 112-1 and 112-2 were formed using the electrode 112, and storage batteries 113-1 to 113-3 were formed using the electrode 113. The amount of active material of each of the electrodes 111 to 113 was approximately 2.0 mg/cm$^2$.

Coin-type storage batteries (CR2032 type, with a diameter of 20 mm and a height of 3.2 mm) were used as the storage batteries. For a separator, a stack of polypropylene and GF/C, which is glass-fiber filter paper manufactured by Whatman, was used. An electrolytic solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 3:7. A positive electrode can and a negative electrode can were formed of stainless steel (SUS).

[Measurement of Storage Batteries]

Next, the formed half cells were charged and discharged. The measurement temperature was 25° C. Conditions for the charge and discharge were explained below. The discharge (Li reception) was performed in the following manner: constant current discharge was performed at 180 mA/g with the lower limit set to 0.01 V, and then, constant voltage discharge was performed at 0.01 V with the lower limit set to a current value corresponding to 18 mA/g. The charge (Li release) was performed by constant current charge at 180 mA/g with the upper limit set to 2.5 V. A 1-hour break was taken after the charge and discharge. The break means the battery is held without voltage application. The storage battery 111-3, the storage battery 112-2, and the storage battery 113-3 were charged and discharged only in one cycle. Charge and discharge cycle performances of the other storage batteries were measured. The charge and discharge cycle performances are described later.

Figure 32A:
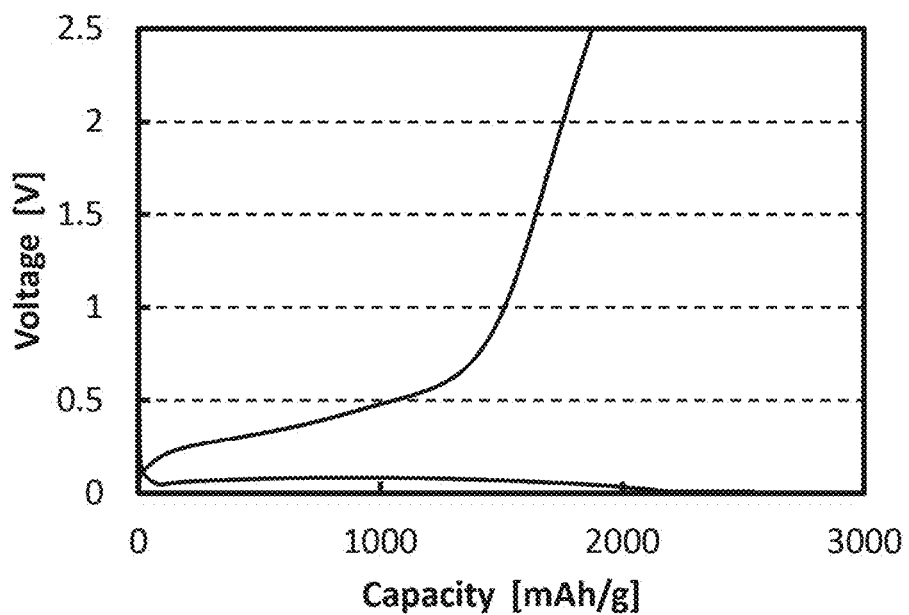
FIGS. 32A and 32B show results of charge and discharge measurement on a storage battery.
Figure 32B:
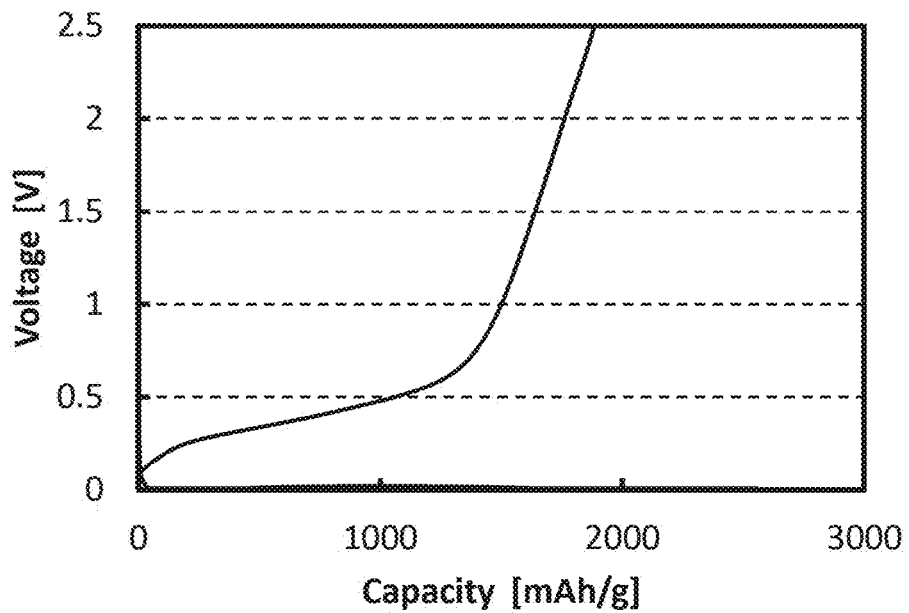
Figure 33:
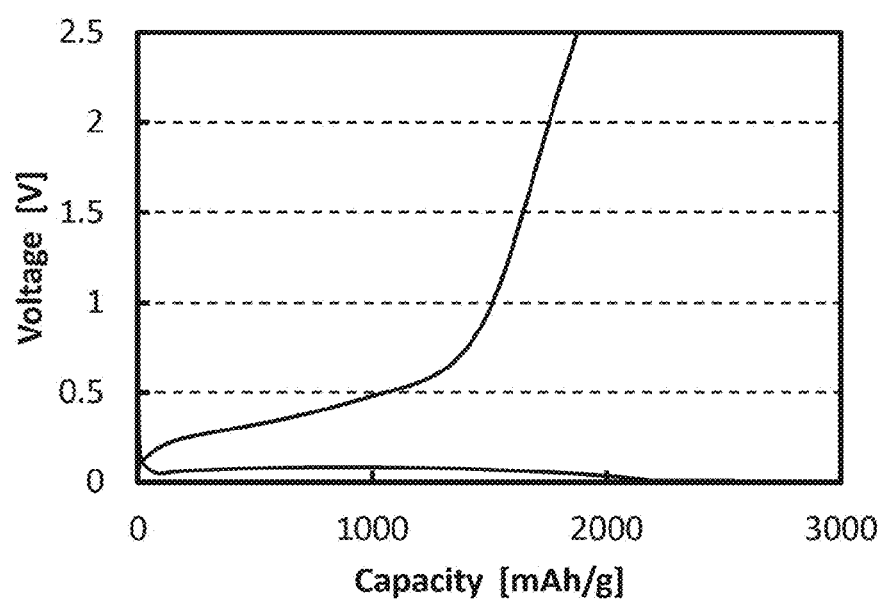
FIG. 33 shows a result of charge and discharge measurement on a storage battery.

The charge-discharge curve of the storage battery 111-3 is shown in FIG. 32A, the charge-discharge curve of the storage battery 112-2 is shown in FIG. 32B, and the charge-discharge curve of the storage battery 113-3 is shown in FIG. 33. Here, the charge capacity and the discharge capacity were normalized with the weight of the active material.

[SEM Observation]

Figure 34A:
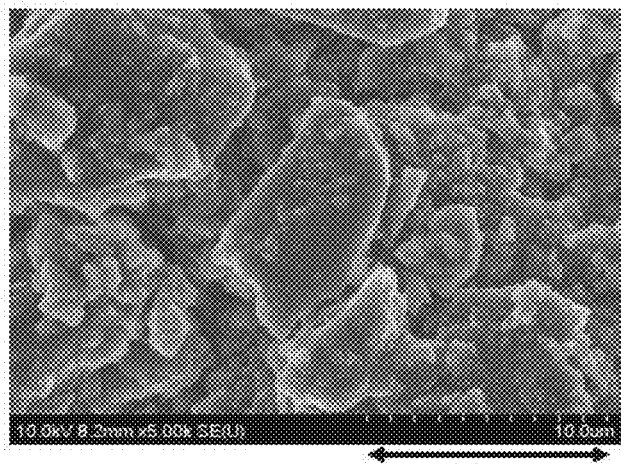
FIGS. 34A to 34C show SEM images.
Figure 34B:
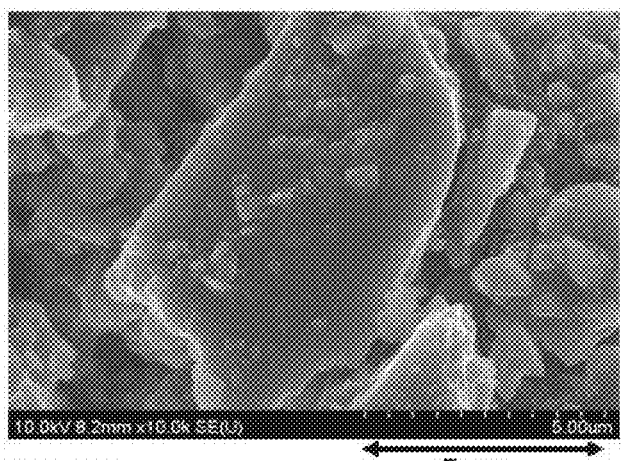
Figure 34C:
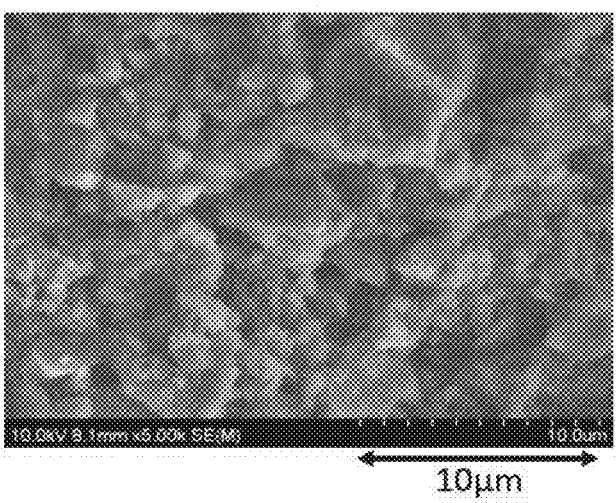
Figure 35A:
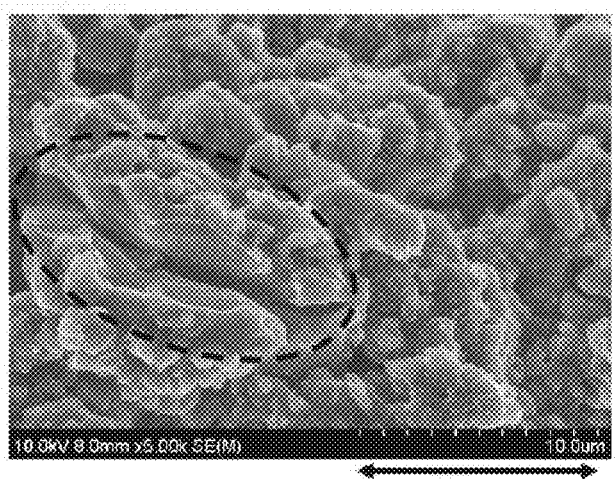
FIGS. 35A to 35C show SEM images.
Figure 35B:
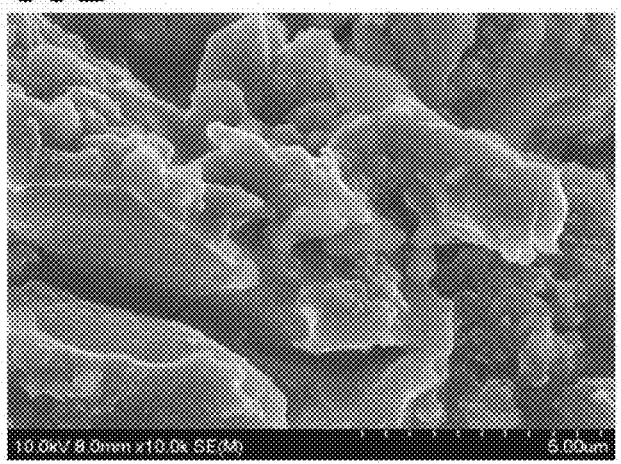
Figure 35C:
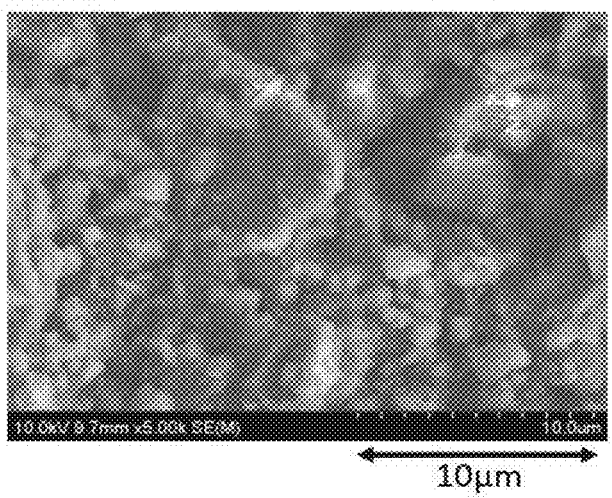
Figure 36A:
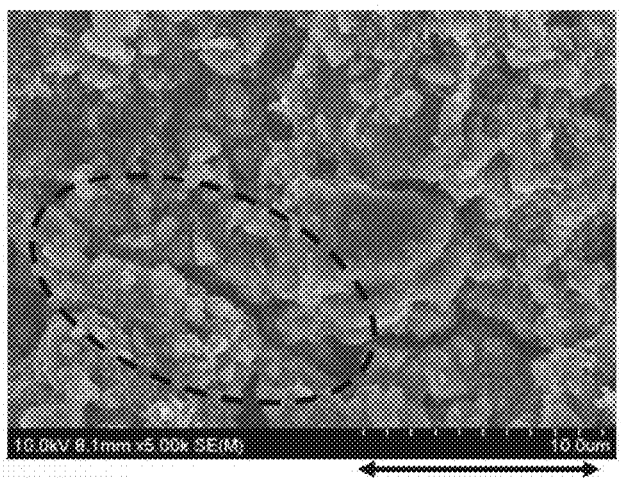
FIGS. 36A to 36C show SEM images.
Figure 36B:
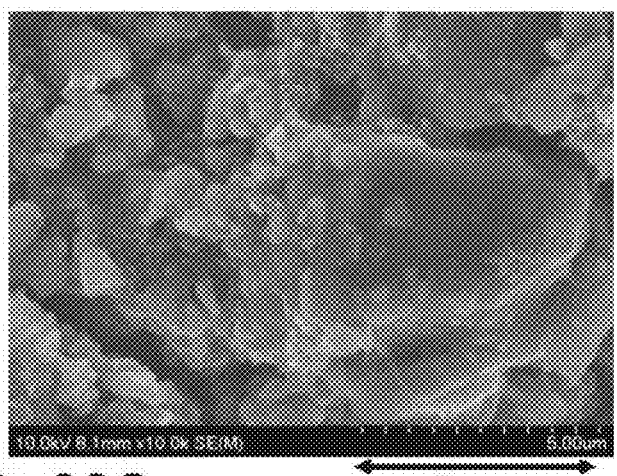
Figure 36C:
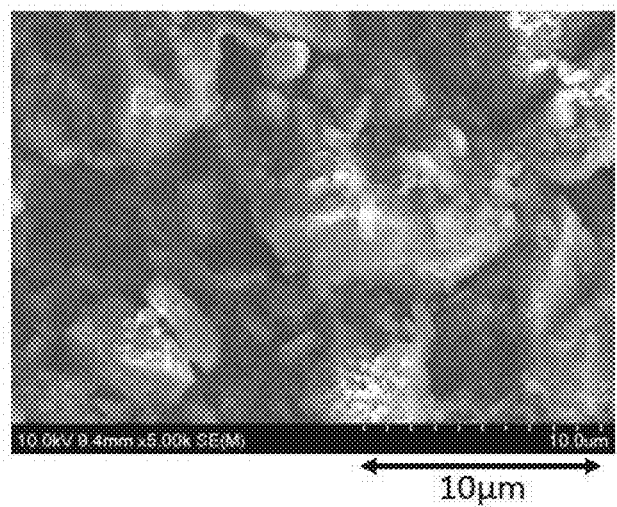

After charge and discharge were performed in one cycle, the storage battery 111-3, the storage battery 112-2 and the storage battery 113-3 were deconstructed and the electrodes were taken out and observed with scanning electron microscopy (SEM). The observation results are shown in FIGS. 34A to 34C, FIGS. 35A to 35C, and FIGS. 36A to 36C. FIGS. 34A and 34B show observation results of the electrode 111 of the storage battery 111-3, FIGS. 35A and 35B show observation results of the electrode 112 of the storage battery 112-2, and FIGS. 36A and 36B show observation results of the electrode 113 of the storage battery 113-3. FIG. 34C shows an observation result of the electrode 111 not subjected to charge and discharge, FIG. 35C shows an observation result of the electrode 112 not subjected to charge and discharge, and FIG. 36C shows an observation result of the electrode 113 not subjected to charge and discharge.

In the half cell using the active material where the crystallite size of silicon is 6.7 nm or 12 nm, a crack of a particle of the active material was observed as shown in a region surrounded by a dashed line in FIG. 35A or FIG. 36A, respectively. FIG. 35B and FIG. 36B are enlarged view of FIG. 35A and FIG. 36A. It is estimated that the crack of the particle was generated because of expansion and contraction of silicon at the time of charge and discharge. In contrast, under a condition where the crystallite size of silicon was 3.2 nm, a crack of a particle of the active material was not observed. Because the crystallite size of silicon is small, it is estimated that, in the active material, a stress generated by expansion and contraction of silicon at the time of charge and discharge can be reduced by a region (e.g., a region including silicon oxide) at the periphery of a portion expanded and contracted.

Figure 37A:
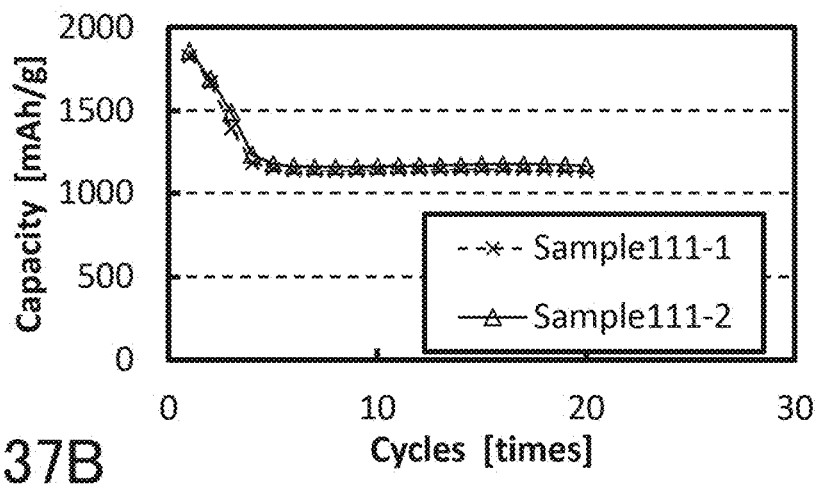
FIGS. 37A to 37C show charge and discharge cycle performance of storage batteries.
Figure 37B:
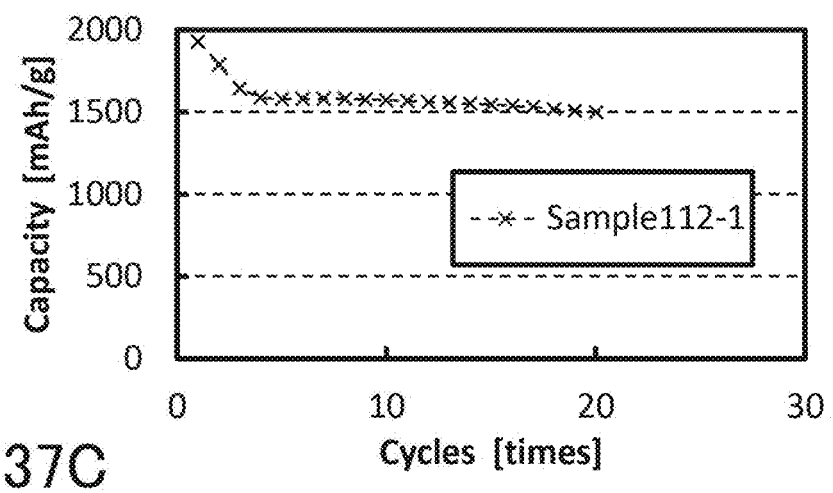
Figure 37C:
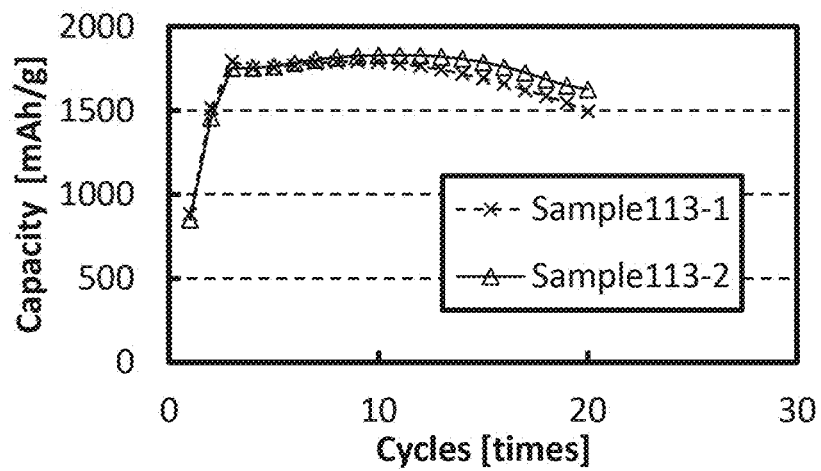

The charge and discharge cycle performances of the storage batteries 111-1 and 111-2 are shown in FIG. 37A, and the performances of the storage battery 112-1 is shown in FIG. 37B, and the performance of the storage batteries 113-1 and 113-2 are shown in FIG. 37C. In FIGS. 37A to 37C, the horizontal axis represents the number of times of charge and discharge, and the vertical axis represents the charge capacity (the capacity at the time of Li release). The charge capacity was normalized by weight of the active material. Under the condition where the crystallite size of silicon was 3.2 nm or 6.7 nm, decrease in capacity was suppressed and the cycle performances were excellent as compared with the condition of 12 nm.

Figure 38A:
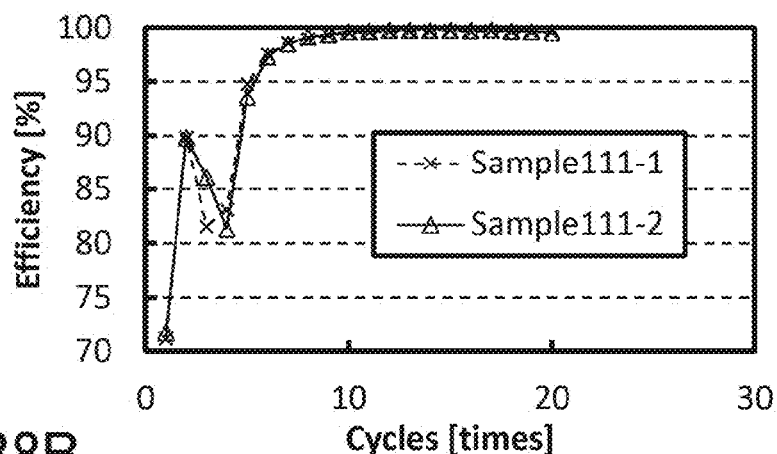
FIGS. 38A to 38C show charge and discharge efficiency of storage batteries.
Figure 38B:
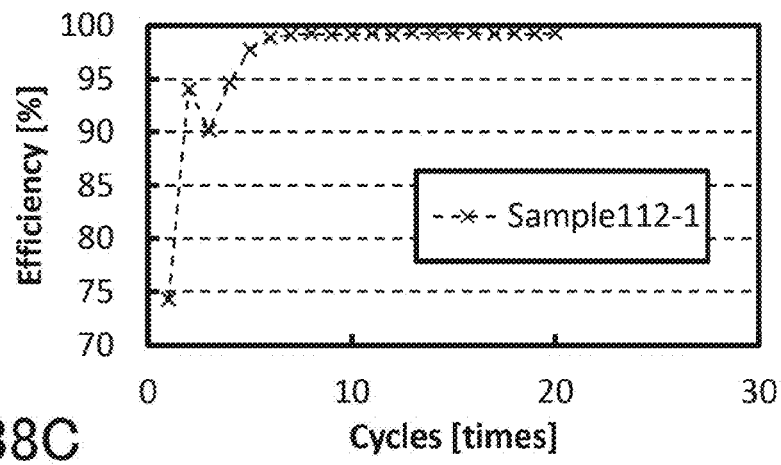
Figure 38C:
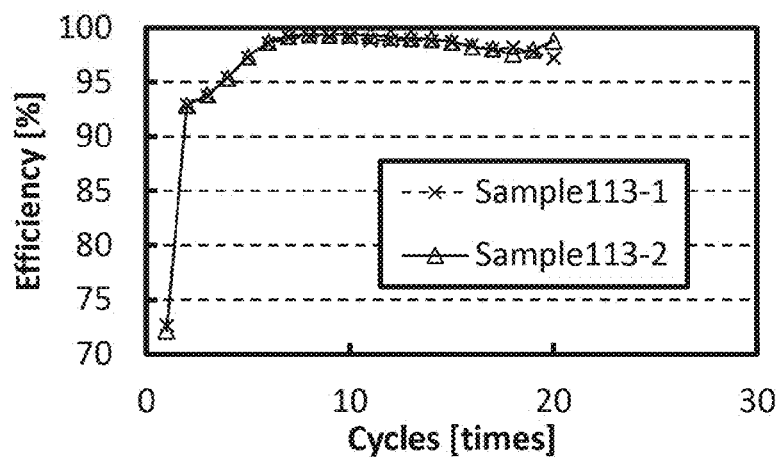

Charge and discharge efficiency of each cycle is shown in FIGS. 38A to 38C. Note that the charge and discharge efficiency means [(charge capacity/discharge capacity)×100] [%]. The shift of the charge and discharge efficiency caused by charge and discharge cycles in the storage batteries 111-1 and 111-2 are shown in FIG. 38A, and the shift in the storage battery 112-1 is shown in FIG. 38B, and the shift in the storage batteries 113-1 and 113-2 are shown in FIG. 38C. The average charge and discharge efficiency in 11 to 15 cycles was calculated, and the average value was 99.7% in the storage battery 111-1, 99.8% in the storage battery 111-2, 99.2% in the storage battery 112-1, 98.8% in the storage battery 113-1, and 99.0% in the storage battery 113-2. When the crystallite size of silicon was 3.2 nm, that is, in the storage batteries 111-1 and 111-2, the charge and discharge efficiency was higher and more excellent.

REFERENCE NUMERALS

100: negative electrode active material, 101: region, 102: region, 103: region, 200: negative electrode, 201: negative electrode current collector, 202: negative electrode active material layer, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 510: positive electrode lead electrode, 511: negative electrode lead electrode, 512: welding region, 513: bent portion, 514: sealing member, 521: graphene flake, 522: positive electrode active material, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 951: terminal, 952: terminal, 981: film, 982: film, 990: storage battery, 991: exterior body, 992: exterior body, 993: wound body, 994: negative electrode, 995: positive electrode, 996: separator, 997: lead electrode, 998: lead electrode, 1122: charger, 1123: load, 1500: secondary battery, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 1805: component including electrodes and an electrolytic solution, 7100: portable display device, 7101: housing, 7102: display portion, 7103: operation button, 7104: power storage device, 7200: portable information terminal, 7201: housing, 7202: display portion, 7203: band, 7204: buckle, 7205: operation button, 7206: input output terminal, 7207: icon, 7300: display device, 7304: display portion, 7400: cellular phone, 7401: housing, 7402: display portion, 7403: operation button, 7404: external connection port, 7405: speaker, 7406: microphone, 7407: power storage device, 8000: display device, 8001: housing, 8002: display portion, 8003: speaker portion, 8004: power storage device, 8021: charging apparatus, 8022: cable, 8024: power storage device, 8100: lighting device, 8101: housing, 8102: light source, 8103: power storage device, 8104: ceiling, 8105: wall, 8106: floor, 8107: window, 8200: indoor unit, 8201: housing, 8202: air outlet, 8203: power storage device, 8204: outdoor unit, 8206: electric motor, 8300: electric refrigerator-freezer, 8301: housing, 8302: door for a refrigerator, 8303: door for a freezer, 8304: power storage device, 8400: automobile, 8401: headlight, 8500: automobile, 9600: tablet terminal, 9625: switch, 9626: switch, 9627: power switch, 9628: operation switch, 9629: fastener, 9630: housing, 9630a: housing, 9630b: housing, 9631: display portion, 9631a: display portion, 9631b: display portion, 9632a: region, 9632b: region, 9633: solar cell, 9634: charge and discharge control circuit, 9635: power storage unit, 9636: DC-DC converter, 9637: converter, 9638: operation key, 9639: button, 9640: movable portion.

This application is based on Japanese Patent Application serial no. 2014-107441 filed with Japan Patent Office on May 23, 2014, the entire contents of which are hereby incorporated by reference.

The invention claimed is:

1. A negative electrode active material comprising:
a first region comprising silicon;
a second region comprising silicon oxide; and
a third region comprising amorphous silicon,
wherein a crystallite size of the silicon is larger than or equal to 1 nm and smaller than or equal to 10 nm, and
wherein a particle size of the negative electrode active material is larger than or equal to 30 nm and smaller than or equal to 30 μm.

2. The negative electrode active material according to claim 1, wherein the first region is surrounded by the second region.

3. The negative electrode active material according to claim 1, wherein the crystallite size of the silicon is larger than or equal to 2 nm and smaller than or equal to 5 nm.

4. The negative electrode active material according to claim 1, wherein the crystallite size is measured by an X-ray diffraction method.

5. The negative electrode active material according to claim 1, wherein an atomic ratio of silicon and oxygen of the silicon oxide is expressed as Si:O=x:y and the silicon oxide comprises a region of x<y.

6. A power storage device comprising:
a positive electrode; and
a negative electrode comprising a negative electrode current collector and the negative electrode active material according to claim 1,
wherein the negative electrode active material is positioned between the positive electrode and the negative electrode current collector.

7. A negative electrode active material comprising:
a first region comprising silicon;
a second region comprising silicon oxide; and
a third region comprising amorphous silicon,
wherein a crystallite size of the silicon in the first region is larger than or equal to 1 nm and smaller than or equal to 10 nm,
wherein a particle size of the negative electrode active material is larger than or equal to 30 nm and smaller than or equal to 30 μm, and
wherein the second region is surrounded by the third region.

8. The negative electrode active material according to claim 7, wherein the first region is surrounded by the second region.

9. The negative electrode active material according to claim 7, wherein the crystallite size of the silicon is larger than or equal to 2 nm and smaller than or equal to 5 nm.

10. The negative electrode active material according to claim 7, wherein the crystallite size is measured by an X-ray diffraction method.

11. The negative electrode active material according to claim 7, wherein an atomic ratio of silicon and oxygen of the silicon oxide is expressed as Si:O=x:y and the silicon oxide comprises a region of x<y.

12. A power storage device comprising:
a positive electrode; and
a negative electrode comprising a negative electrode current collector and the negative electrode active material according to claim 7,
wherein the negative electrode active material is positioned between the positive electrode and the negative electrode current collector.

13. The power storage device according to claim 12, wherein the silicon in the first region of the negative electrode active material is in contact with the negative electrode current collector.

14. The power storage device according to claim 12, wherein the silicon oxide of the negative electrode active material is in contact with the negative electrode current collector.

15. A negative electrode active material comprising:
a first region comprising at least one element selected from Si, Mg, Ca, Ga, Al, Ge, Sn, Pb, Sb, Bi, Ag, Zn, Cd, As, Hg, and In;
a second region comprising oxygen and an element same as the element in the first region; and
a third region comprising amorphous silicon,
wherein a crystallite size of the element in the first region is larger than or equal to 1 nm and smaller than or equal to 10 nm.

16. The negative electrode active material according to claim 15, wherein the first region is surrounded by the second region.

17. The negative electrode active material according to claim 15, wherein the crystallite size of the element in the first region is larger than or equal to 2 nm and smaller than or equal to 5 nm.

18. The negative electrode active material according to claim 15, wherein the crystallite size is measured by an X-ray diffraction method.

19. A power storage device comprising:
a positive electrode; and
a negative electrode comprising a negative electrode current collector and the negative electrode active material according to claim 15,
wherein the negative electrode active material is positioned between the positive electrode and the negative electrode current collector.

* * * * *